(12) United States Patent
Hashimoto

(10) Patent No.: US 10,247,146 B2
(45) Date of Patent: Apr. 2, 2019

(54) SOLENOID VALVE DEVICE AND METHOD OF CONTROLLING A SOLENOID VALVE

(71) Applicant: FUJITSU TEN LIMITED, Kobe-shi, Hyogo (JP)

(72) Inventor: Sumiaki Hashimoto, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 260 days.

(21) Appl. No.: 15/280,354

(22) Filed: Sep. 29, 2016

(65) Prior Publication Data
US 2017/0122268 A1    May 4, 2017

(30) Foreign Application Priority Data
Oct. 28, 2015   (JP) .................................. 2015-212374

(51) Int. Cl.
| F16K 31/02 | (2006.01) |
| F02M 26/53 | (2016.01) |
| F16K 31/06 | (2006.01) |
| F02M 26/66 | (2016.01) |

(52) U.S. Cl.
CPC ............ *F02M 26/53* (2016.02); *F02M 26/66* (2016.02); *F16K 31/06* (2013.01)

(58) Field of Classification Search
CPC ......... F16K 31/06; F02M 26/53; F02M 26/66
USPC ................ 137/487.5, 488, 489, 100, 115.13; 251/129.15; 91/416; 60/428, 429
See application file for complete search history.

(56) References Cited

U.S. PATENT DOCUMENTS

| 4,233,947 | A | * | 11/1980 | Abo | ..................... | F02D 41/0077 |
| | | | | | | 123/568.27 |
| 4,796,651 | A | * | 1/1989 | Ginn | ......................... | G01F 1/22 |
| | | | | | | 137/487 |
| 4,840,350 | A | * | 6/1989 | Cook | ..................... | F16K 31/04 |
| | | | | | | 137/486 |
| 5,532,922 | A | * | 7/1996 | Wacker | .............. | G05B 13/0265 |
| | | | | | | 700/282 |
| 5,613,479 | A | * | 3/1997 | Gates | ................... | F02D 41/0072 |
| | | | | | | 123/568.27 |
| 7,231,906 | B1 | * | 6/2007 | Haskara | ................ | F02D 35/028 |
| | | | | | | 123/435 |
| 7,848,872 | B2 | * | 12/2010 | Ma | ...................... | F02D 41/0072 |
| | | | | | | 123/568.21 |

(Continued)

FOREIGN PATENT DOCUMENTS

| CN | 101072940 A | 11/2007 |
| JP | H06-323200 A | 11/1994 |
| JP | H10-318047 A | 12/1998 |

*Primary Examiner* — Minh Le
(74) *Attorney, Agent, or Firm* — Oliff PLC

(57) ABSTRACT

A solenoid valve device according to an aspect of an embodiment includes a solenoid valve, a determination unit, a setting unit, and a correction setting unit. The solenoid valve is provided on a fluid channel with a fluid passing there through and adjusts a flow rate of the fluid. The determination unit determines a target degree of valve opening of the solenoid valve. The setting unit sets a driving signal for driving the solenoid valve in such a manner that a degree of valve opening of the solenoid valve is the target degree of valve opening. The correction setting unit sets a differential pressure correction signal for driving the solenoid valve in accordance with a differential pressure on the fluid channel between a front and a back of the solenoid valve.

15 Claims, 13 Drawing Sheets

(56) References Cited

U.S. PATENT DOCUMENTS

| | | | | |
|---|---|---|---|---|
| 8,365,761 | B2* | 2/2013 | Bleile | F02D 9/1065 |
| | | | | 137/400 |
| 8,505,872 | B2* | 8/2013 | Kawamura | F16K 31/04 |
| | | | | 123/568.19 |
| 9,222,441 | B2* | 12/2015 | Yoshioka | F02M 25/0701 |
| 2001/0029935 | A1* | 10/2001 | Cook | F02D 21/08 |
| | | | | 123/568.27 |
| 2002/0134956 | A1* | 9/2002 | Smith | G05B 19/44 |
| | | | | 251/129.04 |
| 2005/0092308 | A1* | 5/2005 | Tsokonas | F02M 26/48 |
| | | | | 123/568.23 |
| 2008/0078176 | A1* | 4/2008 | de Ojeda | F02D 21/08 |
| | | | | 60/605.2 |
| 2009/0229583 | A1 | 9/2009 | Kotooka et al. | |
| 2014/0102092 | A1* | 4/2014 | Karnik | F02B 37/186 |
| | | | | 60/602 |
| 2014/0298801 | A1* | 10/2014 | Akita | F02D 41/0065 |
| | | | | 60/602 |
| 2016/0131057 | A1* | 5/2016 | Lahti | F02D 41/0077 |
| | | | | 701/103 |
| 2016/0215716 | A1* | 7/2016 | Yamamoto | F02D 41/1458 |
| 2016/0230684 | A1* | 8/2016 | Surnilla | F02D 41/0077 |

\* cited by examiner

SOLENOID VALVE DEVICE AND METHOD OF CONTROLLING A SOLENOID VALVE

CROSS-REFERENCE TO RELATED APPLICATION

This application is based upon and claims the benefit of priority of the prior Japanese Patent Application No. 2015-212374, filed on Oct. 28, 2015, the entire contents of which are incorporated herein by reference.

FIELD

An embodiment of the disclosure relates to a solenoid valve device and a method of controlling a solenoid valve.

BACKGROUND

For example, a solenoid valve that uses a linear solenoid has conventionally been known as an EGR valve of an internal combustion engine that is mounted on a vehicle. In a conventional technique, such a solenoid valve operates within a predetermined stable range (see, for example, Japanese Laid-open Patent Publication No. 6-323200).

In recent years, it is desired that a range of a flow rate of exhaust gas that can be adjusted by an EGR valve is extended, that is, the EGR valve is extensively operated, in order to further reduce a nitrogen oxide (that will be described as a "NOx" below) in the exhaust gas. However, a conventional EGR valve is an EGR valve that is operated within only a predetermined stable range, so that the EGR valve do not be operated more extensively.

SUMMARY

A solenoid valve device according to an aspect of the embodiment includes a solenoid valve, a determination unit, a setting unit, a setting unit, and a correction setting unit. The solenoid valve is provided on a fluid channel with a fluid passing there through and adjusts a flow rate of the fluid. The determination unit determines a target degree of valve opening of the solenoid valve. The setting unit sets a driving signal for driving the solenoid valve in such a manner that a degree of valve opening of the solenoid valve is the target degree of valve opening. The correction setting unit that sets a differential pressure correction signal for driving the solenoid valve in accordance with a differential pressure on the fluid channel between a front and a back of the solenoid valve.

BRIEF DESCRIPTION OF DRAWING(S)

More complete recognition of the present invention and advantage involved therewith could readily be understood by reading the following detailed description of the invention in light of the accompanying drawings.

DESCRIPTION OF EMBODIMENTS

Hereinafter, an embodiment of a solenoid valve device and a method of controlling a solenoid valve as disclosed in the present application will be described in detail, with reference to the accompanying drawings. This invention is not limited to an embodiment illustrated below.

1. Method of Controlling Solenoid Valve

A method of controlling a solenoid valve according to an embodiment of the present invention will be described by using FIG. 1A to FIG. 1D. FIG. 1A to FIG. 1D are illustration diagrams illustrating a method of controlling a solenoid valve according to the embodiment. Although a method of controlling a solenoid valve that is mounted on, for example, an internal combustion engine of an automobile will be described in the present embodiment, such a method of controlling a solenoid valve is not limited thereto and can be applied to methods of controlling a variety of solenoid valves.

A technique called an exhaust gas recirculation mechanism (that will be described as an EGR mechanism below) has been incorporated in an internal combustion engine of an automobile in order to reduce a NOx in exhaust gas that is emitted by combustion in the internal combustion engine. Specifically, an EGR mechanism is a technique of sending a portion of exhaust gas in an internal combustion engine to an intake side thereof so that exhaust gas is introduced again.

An EGR mechanism is provided with an EGR valve 18 that adjusts an amount of exhaust gas that is sent to the intake side. A method of controlling a solenoid valve that is used as the EGR valve 18 will be described in the present embodiment. FIG. 1A to FIG. 1D illustrate a configuration needed for a description of a method of controlling a solenoid valve 18 and omit illustration of a part of the configuration.

Figure 1A:
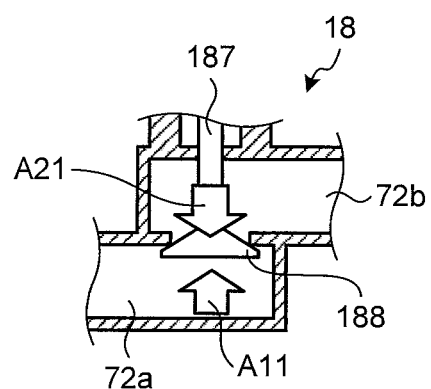
FIG. 1A is an illustration diagram illustrating a method of controlling a solenoid valve according to an embodiment.

As illustrated in FIG. 1A, the solenoid valve 18 is provided between an exhaust side circulation flow pipe 72a and an intake side circulation flow pipe 72b of an EGR mechanism (where the exhaust side circulation flow pipe 72a and the intake side circulation flow pipe 72b will also be collectively described as an exhaust gas circulation flow pipe 72). In the solenoid valve 18, a valve head 188 and a valve stem 187 that supports the valve head 188 are slid upward or downward by a non-illustrated linear solenoid. Thereby, the solenoid valve 18 is opened or closed to change a flow rate of exhaust gas that flows from the exhaust side circulation flow pipe 72a to the intake side circulation flow pipe 72b. Thus, the solenoid valve 18 as illustrated in FIG. 1A is a so-called poppet-type valve.

Figure 1B:
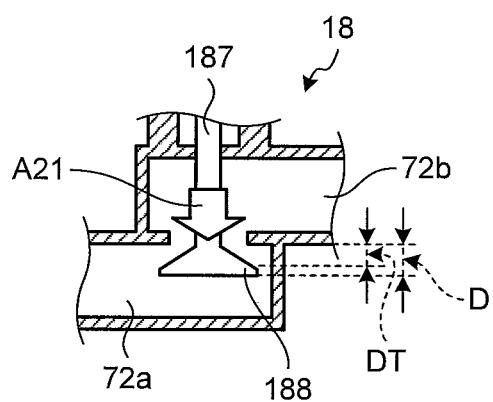
FIG. 1B is an illustration diagram illustrating a method of controlling a solenoid valve according to an embodiment.

First, a method of controlling a general solenoid valve 18 will be described by using FIG. 1A and FIG. 1B. In general, feedback control for gradually increasing a driving signal I that is input to the linear solenoid is executed in such a manner that a degree of valve opening D of the solenoid valve 18 is a predetermined target degree of valve opening DT.

Herein, for example, as the solenoid valve 18 is opened in a downward direction in FIG. 1A, it is affected by a pressure difference A11 between the exhaust side circulation flow pipe 72a and the intake side circulation flow pipe 72b (that will also be described as a "differential pressure" simply). Accordingly, for example, as the target degree of valve opening DT is small, the solenoid valve 18 is not opened by the driving signal I with a magnitude that corresponds to the target degree of valve opening DT. As the driving signal I that is input to the linear solenoid is further increased, thrust force A21 that is greater than a differential pressure A11 is applied to the valve head 188 so that the solenoid valve 18 is opened.

As the solenoid valve 18 is opened, exhaust gas flows from the exhaust side circulation flow pipe 72a to the intake side circulation flow pipe 72b so that the differential pressure is reduced. However, as illustrated in FIG. 1B, the thrust force A21 that is large and identical to that before valve opening is applied to the valve head 188. Therefore, the valve head 188 greatly slides in a downward direction in FIG. 1B so that the degree of valve opening D is greater than the target degree of valve opening DT and the solenoid valve 18 is opened quickly.

As the solenoid valve 18 is thus opened quickly, excessive exhaust gas flows from the exhaust side circulation flow pipe 72a to the intake side circulation flow pipe 72b. In a general controlling method, the target degree of valve opening DT is set within a range for enabling the solenoid valve 18 to operate stably except a range for causing the solenoid valve 18 to open quickly. Accordingly, an operating range of the solenoid valve 18 is reduced.

The degree of valve opening D of the solenoid valve 18 is determined by an amount of a slide of the valve head 188, that is, an amount of a lift of the solenoid valve 18. Therefore, the degree of valve opening D of the solenoid valve 18 will also be described as an amount of a lift D below.

Figure 1C:
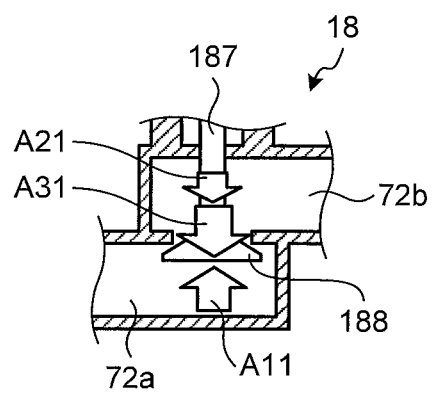
FIG. 1C is an illustration diagram illustrating a method of controlling a solenoid valve according to an embodiment.

Then, a method of controlling a solenoid valve 18 according to the present embodiment will be described by using FIG. 1C and FIG. 1D. In a controlling method according to the present embodiment, a differential pressure correction signal IP that corresponds to the differential pressure A11 is input to a linear solenoid of the solenoid valve 18 until the solenoid valve 18 is opened. Thereby, quick opening of the solenoid valve 18 is suppressed. Furthermore, in a controlling method according to the present embodiment, feedback control of the driving signal I is executed after valve opening in such a manner that the degree of valve opening D of the solenoid valve 18 is the predetermined target degree of valve opening DT, similarly to the controlling method as described above. Thereby, the solenoid valve 18 can also be controlled stably after valve opening.

Specifically, in a controlling method according to the present embodiment, a corrected driving signal IC provided by adding the driving signal I and the differential pressure correction signal IP that corresponds to the differential pressure A11 is input to the linear solenoid until the solenoid valve 18 is opened. Therefore, as illustrated in FIG. 1C, the thrust force A21 that corresponds to the driving signal I and thrust force A31 that corresponds to the differential pressure correction signal IP are applied to the valve head 188 of the solenoid valve 18 in a direction of valve opening, that is, a downward direction in FIG. 1C.

Herein, the differential pressure correction signal IP is a signal of electric current that flows in the linear solenoid of the solenoid valve 18 and is slightly greater than electric current that flows though the linear solenoid of the solenoid valve 18 when the solenoid valve 18 is opened quickly (that will also be described as quick opening electric current, below). It is also possible to consider that the quick opening electric current is electric current needed to open the solenoid valve 18.

Accordingly, as the differential pressure correction signal IP is input to the linear solenoid, the thrust force A31 that is slightly greater than a pressure that is applied to the valve head 188 or the differential pressure A11 is applied to the valve head 188. Thereby, the thrust force A31 counteracts such a pressure or the differential pressure A11 so that the solenoid valve 18 is slightly opened.

Figure 1D:
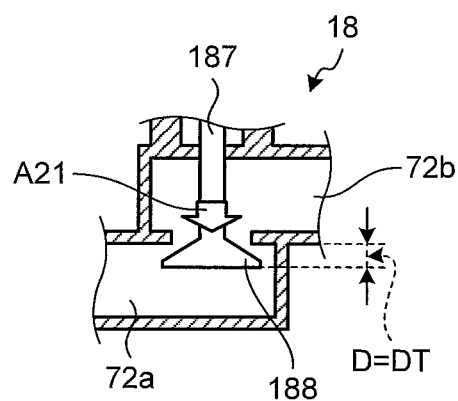
FIG. 1D is an illustration diagram illustrating a method of controlling a solenoid valve according to an embodiment.

As the driving signal I that corresponds to the target degree of valve opening DT is input to the linear solenoid in a state where the solenoid valve 18 is slightly opened by the differential pressure correction signal IP, the solenoid valve 18 is opened by the target degree of valve opening DT due to the thrust force A21 that is generated by the driving signal I as illustrated in FIG. 1D. After valve opening, the solenoid valve 18 is controlled in accordance with the amount of a lift D that is detected by a non-illustrated lift sensor.

Thus, the differential pressure correction signal IP is input to the linear solenoid in accordance with the differential pressure A11 so that the solenoid valve 18 is provided in a state where the valve is slightly opened. Furthermore, the corrected driving signal IC provided by adding the differential pressure correction signal IP and the driving signal I is input to the linear solenoid so that the solenoid valve 18 can be opened by the target degree of valve opening DT in a state where the solenoid valve 18 is slightly opened.

Therefore, the solenoid valve 18 can be controlled by a controlling method according to the present embodiment so as to provide the target degree of valve opening DT without quick opening thereof. Accordingly, in a method of controlling the solenoid valve 18 according to the present embodiment, the solenoid valve 18 can also be operated within a range that could not be utilized to avoid quick opening thereof, so that the solenoid valve 18 can be operated extensively.

In the controlling method as described above, the differential pressure correction signal IP is input to the linear solenoid in a case where the solenoid valve 18 is opened by the target degree of valve opening DT due to the driving signal I, and is not limited thereto. For example, the differential pressure correction signal IP as described above may also be input to the linear solenoid until the solenoid valve 18 is opened in a state where the solenoid valve 18 is closed, that is, a case where the target degree of valve opening DT is zero.

Thereby, the solenoid valve 18 is provided in a state where the valve is slightly opened, even in a case where the target degree of valve opening DT is zero. Accordingly, the solenoid valve 18 is provided in a state where it is not affected by the differential pressure, and is not quickly opened by an influence of the differential pressure when the valve is opened. Thus, even in a state where the target degree of valve opening DT of the solenoid valve 18 is zero, that is, in a state of valve closing, quick opening of the solenoid valve 18 can be suppressed when the valve is opened.

Herein, a state where the solenoid valve 18 is slightly opened refers to, for example, a state where the valve is opened in such a manner that exhaust gas does not flow from the exhaust side circulation flow pipe 72a to the intake side circulation flow pipe 72b or flows so as not to influence EGR. That is, it is possible to consider that a state where the solenoid valve 18 is slightly opened is a state where the solenoid valve 18 is substantially closed. Hereinafter, a solenoid valve device 10 and an internal combustion engine for executing a method of controlling the solenoid valve 18 will further be described.

2. Outline of Internal Combustion Engine

Figure 2:
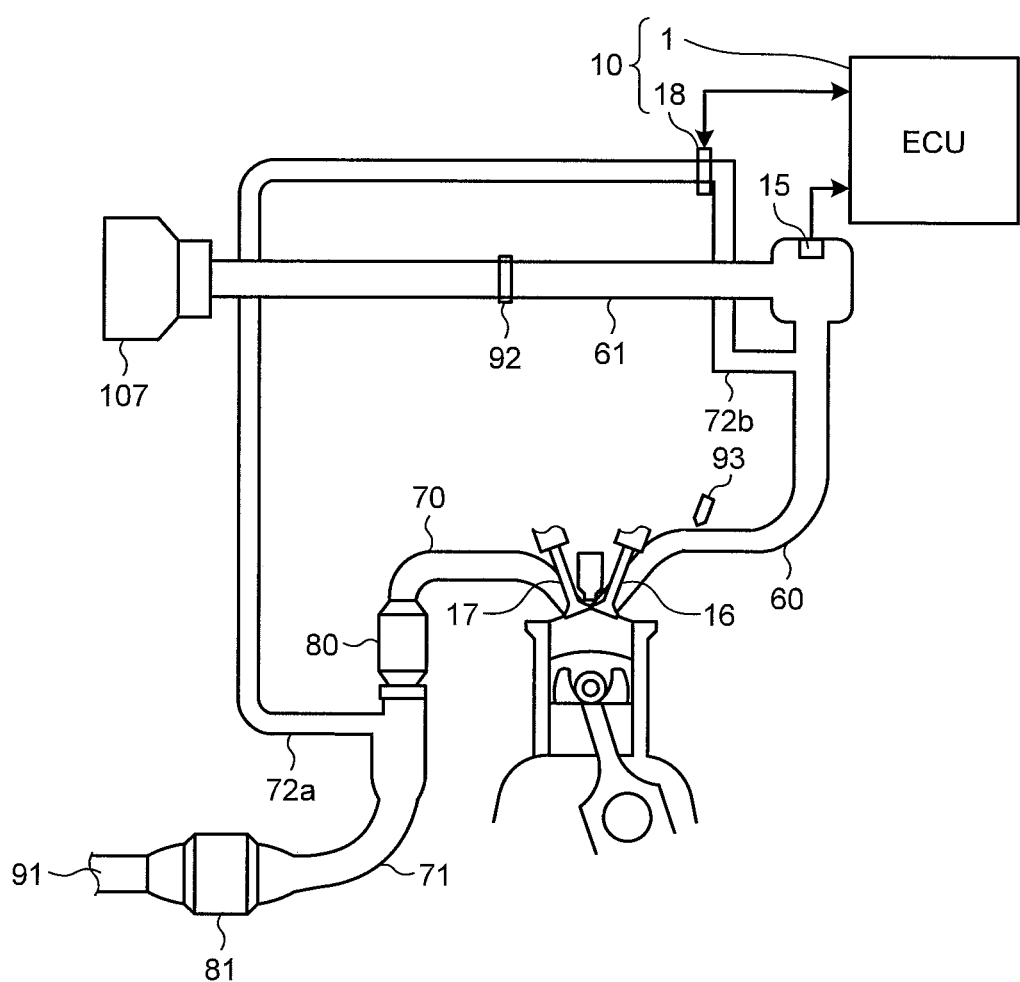
FIG. 2 is a diagram illustrating an outline of an internal combustion engine according to an embodiment.

FIG. 2 is a diagram illustrating an outline of an internal combustion engine according to an embodiment of the present invention. An internal combustion engine as illustrated in FIG. 2 is, for example, an engine of an automobile with a fuel that is gasoline. In the internal combustion engine, a variety of control such as fuel control is executed by an electronic control unit (ECU) 1. That is, the solenoid valve device 10 according to the present embodiment includes the electronic control unit 1 and the solenoid valve 18.

A configuration of the internal combustion engine will be described by using FIG. 2. Although FIG. 2 illustrates a single-cylinder internal combustion engine, this is not limiting and may be a multi-cylinder internal combustion engine.

An intake pipe 60 and an exhaust pipe 70 of the internal combustion engine in FIG. 2 are coupled to a cylinder through an intake valve 16 and an exhaust valve 17, respectively. An exhaust side circulation flow pipe 72a and an intake side circulation flow pipe 72b are coupled to one another through an EGR valve (solenoid valve) 18. The intake pipe 60 includes a throttle valve 92 and an injector 93 that injects a fuel into the intake pipe 60. An intake pipe pressure sensor 15 is provided in a surge tank in the intake pipe 60.

Air is introduced from an intake port 107 provided with an air cleaner through an intake pipe 61 and flows into the intake pipe 60. A portion of exhaust gas that is emitted from the exhaust pipe 70 flows into the exhaust side circulation flow pipe 72a, and further, flows into the intake pipe 60 through the intake side circulation flow pipe 72b as the EGR valve 18 is opened.

The intake valve 16 and the exhaust valve 17 are configured to be coupled to a rotating shaft of an engine and to be mechanically opened or closed in accordance with a state of rotation of the engine or configured to be not mechanically coupled to the rotating shaft of the engine and to be opened or closed by driving force of a motor.

A ternary catalyst device 80 is provided between the exhaust pipe 70 and an exhaust pipe 71. A NOx storage reduction-type ternary catalyst device 81 is provided between the exhaust pipe 71 and an exhaust port 91.

The ternary catalyst device 80 and the NOx storage reduction-type ternary catalyst device 81 are devices that utilizes a catalyst and thereby cleans up harmful components in exhaust gas. For harmful components that are included in exhaust gas from an automobile, a hydrocarbon, carbon monoxide, a nitrogen oxide (NOx), and the like are mainly provided.

The ternary catalyst device 80 and the NOx storage reduction-type ternary catalyst device 81 can oxidize or reduce such harmful components with, for example, a catalyst such as platinum, palladium, or rhodium, and thereby, simultaneously eliminate them.

3. Solenoid Valve Device 10

Figure 3:
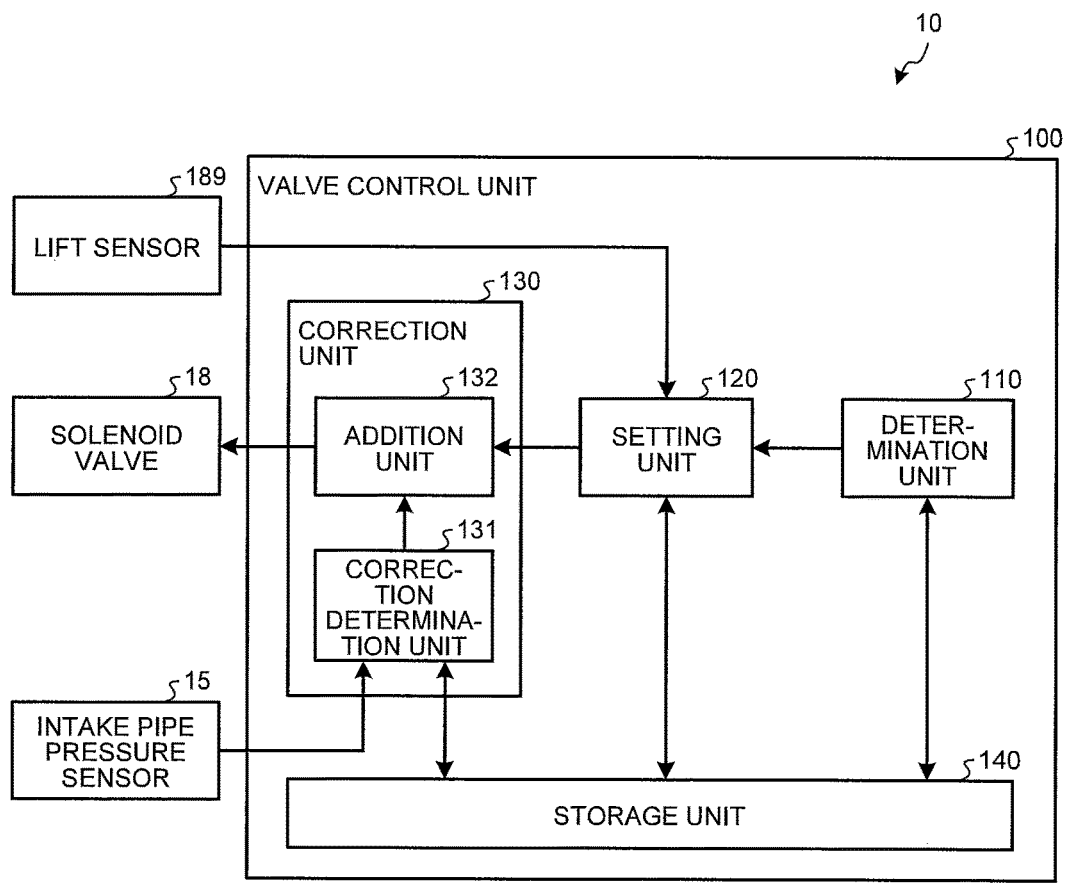
FIG. 3 is a block diagram of a solenoid valve device according to an embodiment.

The solenoid valve device 10 will be described by using FIG. 3. FIG. 3 is a block diagram of the solenoid valve device 10 according to the present embodiment. The solenoid valve device 10 includes the solenoid valve 18, a lift sensor 189, the intake pipe pressure sensor 15, and a valve control unit 100.

3. 1. Solenoid Valve 18

Figure 4:
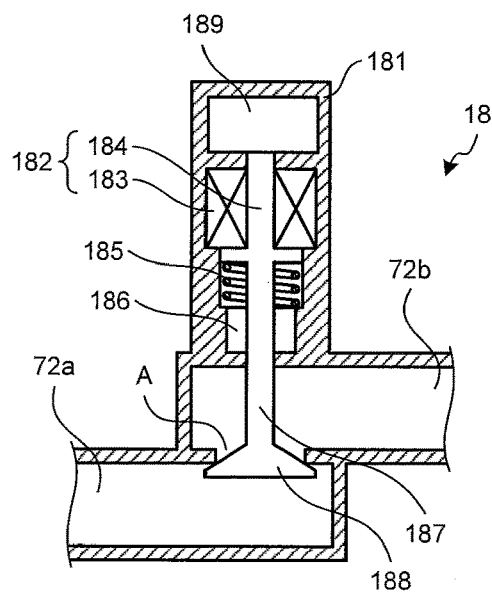
FIG. 4 is a diagram illustrating a configuration of a solenoid valve according to an embodiment.

An outline of the solenoid valve 18 will be described by using FIG. 4. FIG. 4 is a diagram illustrating a configuration of the solenoid valve 18.

As illustrated in FIG. 4, the solenoid valve 18 includes a housing 181, a linear solenoid 182, an elastic member 185, a bearing 186, a valve stem 187, and a valve head 188. The solenoid valve 18 is used as, for example, the EGR valve of the internal combustion engine as illustrated in FIG. 2. Accordingly, the solenoid valve 18 is provided between the exhaust side circulation flow pipe 72a and the intake side circulation flow pipe 72b. The solenoid valve 18 adjusts a flow rate of exhaust gas that flows from the exhaust side circulation flow pipe 72a to the intake side circulation flow pipe 72b.

The housing 181 is formed into a hollow-cylindrical shape. Inside the housing 181, the linear solenoid 182, the elastic member 185, and the bearing 186 are arranged. The housing 181 is formed integrally with, for example, the exhaust side circulation flow pipe 72a and the intake side circulation flow pipe 72b. Although FIG. 4 illustrates a case where the elastic member 185 is a spring, this is not limiting and it is sufficient to be an elastic member that has biasing force in a predetermined direction, for example, a plate spring or the like.

The valve head 188 and the valve stem 187 that supports the valve head 188 are biased by the elastic member 185 in a predetermined direction (upward direction in FIG. 4), and are arranged so as to be linearly slidable in the housing 181, the exhaust side circulation flow pipe 72a and the intake side circulation flow pipe 72b. The bearing 186 linearly slidably supports the valve stem 187. For example, the valve head 188 is arranged so as to plug an opening portion A between the exhaust side circulation flow pipe 72a and the intake side circulation flow pipe 72b.

The linear solenoid 182 applies thrust force to the valve head 188 in a direction (downward direction in FIG. 4) opposite to a predetermined direction of biasing of the elastic member 185. Specifically, the linear solenoid 182 includes a plunger 184 coupled to the valve head 188 through the valve stem 187 and a coil 183 that is opposite to an outer periphery of the plunger 184 through an air gap. As the driving signal I is input to the coil 183, the plunger 184 of the linear solenoid 182 moves in a downward direction in FIG. 4 in accordance with the driving signal I. Thrust force is applied to the valve head 188 in accordance with movement of the plunger 184 so that the valve head 188 is slid. Thereby, as the opening portion A is opened, the solenoid valve 18 is opened so that exhaust gas flows from the exhaust side circulation flow pipe 72*a* to the intake side circulation flow pipe 72*b*.

3. 2. Lift Sensor 189

The lift sensor 189 is provided on, for example, one side of the plunger 184 as illustrated in FIG. 4 and detects an amount of a slide of the plunger 184 as the amount of a lift D of the solenoid valve 18. The lift sensor 189 outputs the detected amount of a lift D to the valve control unit 100. Although a case where the lift sensor 189 is provided separately from the solenoid valve 18 has been described herein, the solenoid valve 18 may include the lift sensor 189.

3. 3. Intake Pipe Pressure Sensor 15

The intake pipe pressure sensor 15 as illustrated in FIG. 3 is provided in the surge tank of the intake pipe 60 (see FIG. 2) and detects a pressure (namely, intake pressure) in the intake pipe 60. For example, a state where the throttle valve 92 in FIG. 2 is opened is a state where a pressure in the intake pipe 60 is a close to an atmospheric pressure. A state where the throttle valve 92 in FIG. 2 is closed is a state where a pressure in the intake pipe 60 is a close to a vacuum. The intake pipe pressure sensor 15 detects, and notifies the valve control unit 100 of, a pressure in the intake pipe 60.

Herein, the solenoid valve device 10 includes the intake pipe pressure sensor 15 and is not limited thereto. For example, a result of detection by the intake pipe pressure sensor 15 may be received by the solenoid valve device 10. Thus, the solenoid valve device 10 may not necessarily include the intake pipe pressure sensor 15.

3. 4. Valve Control Unit 100

The valve control unit 100 as illustrated in FIG. 3 includes a determination unit 110, a setting unit 120, a correction unit 130, and a storage unit 140.

3. 4. 1. Determination Unit 110

The determination unit 110 determines the target degree of valve opening DT of the solenoid valve 18 in accordance with, for example, a control state of an EGR mechanism. Specifically, the determination unit 110 receives, for example, a target amount of exhaust gas that is sent to an intake side, from a non-illustrated EGR control unit, then refers to the storage unit 140, and determines the target degree of valve opening DT that corresponds to the target amount of exhaust gas. The determination unit 110 notifies the setting unit 120 of the determined target degree of valve opening DT.

3. 4. 2. Setting Unit 120

The setting unit 120 sets the driving signal I for driving the solenoid valve 18 in such a manner that the degree of valve opening D of the solenoid valve 18 is the target degree of valve opening DT. The setting unit 120 receives the target degree of valve opening DT from the determination unit 110. The setting unit 120 receives a current amount of a lift (degree of valve opening) D of the solenoid valve 18 from the lift sensor 189. The setting unit 120 sets the driving signal I in such a manner that the degree of valve opening D of the solenoid valve 18 is the target degree of valve opening DT. The setting unit 120 outputs the set driving signal I to the correction unit 130.

3. 4. 3. Correction Unit 130

The correction unit 130 is a correction setting unit that sets the differential pressure correction signal IP for driving the solenoid valve 18, in accordance with a differential pressure on a fluid channel (exhaust gas circulation flow pipe 72) between a front and a back of the solenoid valve 18. The correction unit 130 determines the differential pressure correction signal IP in accordance with the differential pressure and generates a corrected driving signal IC provided by adding the differential pressure correction signal IP and the driving signal I. The correction unit 130 drives the solenoid valve 18 in accordance with the generated corrected driving signal IC.

For example, in a case where the determination unit 110 changes the target degree of valve opening DT, the correction unit 130 sets the differential pressure correction signal IP based on the differential pressure until the degree of valve opening D of the solenoid valve 18 is the target degree of valve opening DT after such a change. The correction unit 130 includes a correction determination unit 131 and an addition unit 132.

3. 4. 3. 1. Correction Determination Unit 131

The correction determination unit 131 determines the differential pressure correction signal IP that corresponds to the differential pressure. The correction determination unit 131 determines the differential pressure correction signal IP based on, for example, the intake pressure that is detected by the intake pipe pressure sensor 15, as the differential pressure. Herein, a relationship between the differential pressure and the intake pressure will be described.

Figure 5:
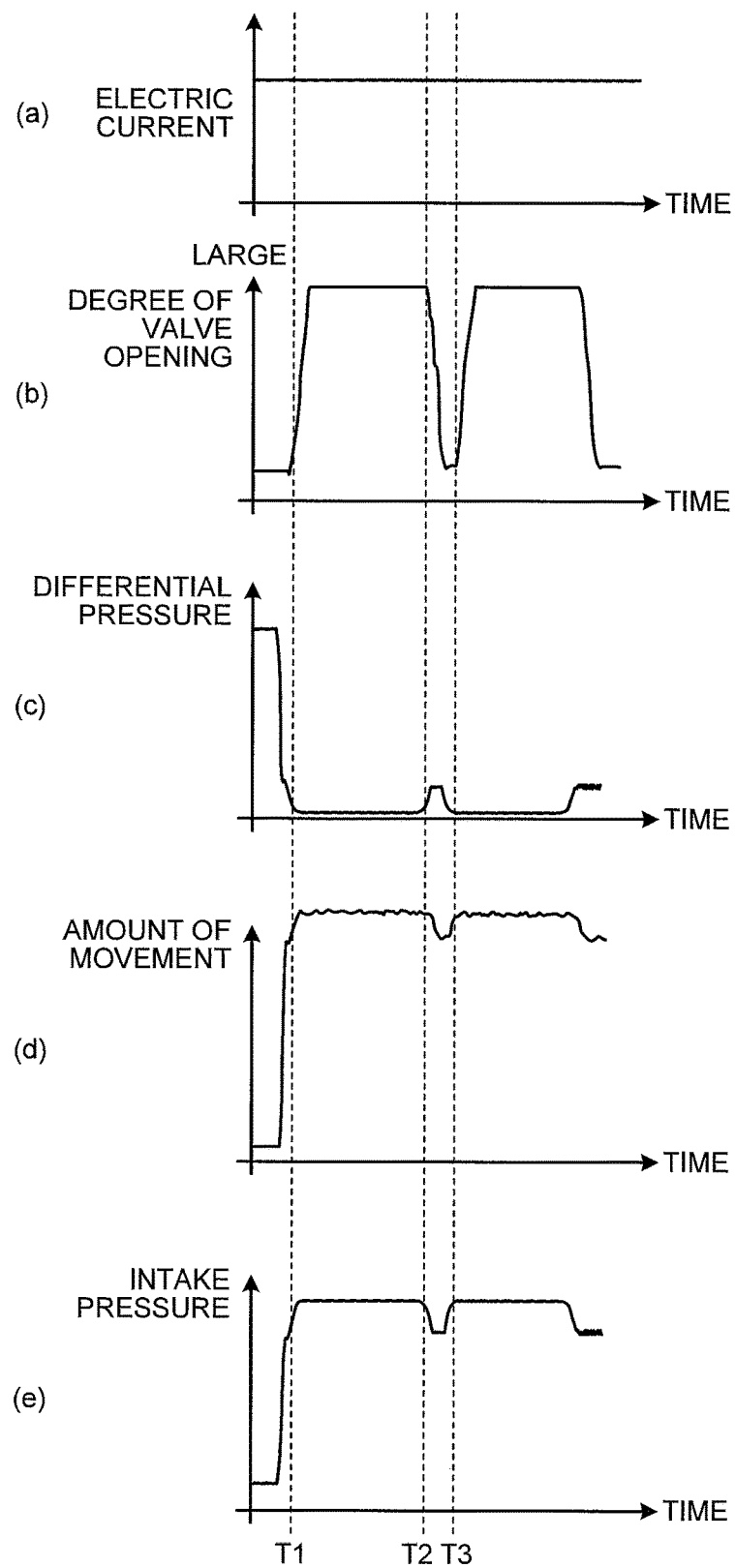
FIG. 5 is a diagram for illustrating a relationship between an intake pressure and a degree of valve opening according to an embodiment.

FIG. 5 is a diagram for illustrating a relationship between the intake pressure and the differential pressure. FIG. 5 (*a*) is a graph illustrating a time change of driving electric current that flows in the solenoid valve 18, where a vertical axis indicates the electric current. FIG. 5 (*b*) is a graph illustrating a time change of a degree of valve opening of the throttle valve 92, where a vertical axis indicates the degree of valve opening of the throttle valve 92. FIG. 5 (*c*) is a graph illustrating a time change of a differential pressure on the exhaust gas circulation flow pipe 72 between a front and a back of the solenoid valve 18, where a vertical axis indicates such a pressure.

FIG. 5 (*d*) is a graph illustrating a time change of the degree of valve opening D of the solenoid valve 18. FIG. 5 (*d*) illustrates a result of the amount of a lift D of the valve head 188 that is detected by the lift sensor 189, as the degree of valve opening D of the solenoid valve 18, where a vertical axis indicates an amount of movement. FIG. 5 (*e*) is a graph illustrating a time change of a pressure (intake pressure) in the intake pipe 60, where a vertical axis indicates the pressure. Any of horizontal axes of FIG. 5 (*a*) to FIG. 5 (*e*) indicates time.

Herein, a case will be described where electric current that flows in the solenoid valve 18 is constant, that is, the solenoid valve 18 is provided in a state where the valve is opened with a constant degree of valve opening D, in order to describe a relationship between the differential pressure and the intake pressure simply.

As illustrated in FIG. 5 (*a*), as constant driving electric current flows in the solenoid valve 18, the valve head 188 moves by a predetermined amount in such a manner that the degree of valve opening D is the target degree of valve opening DT, as indicated by time T1 to time T2 in FIG. 5 (*e*). FIG. 5 (*a*) illustrates driving electric current that flows in the solenoid valve 18 as a constant value, and the driving signal I with such a driving electric current that is, for example, an average, is input to the solenoid valve 18. The driving signal I is, for example, a PWM signal that has a predetermined duty ratio.

Herein, a degree of valve opening, namely, a valve angle, of the throttle valve 92 is changed as indicated by time T2 to time T3 in FIG. 5 (*b*). Thereby, a differential pressure between a front and a back of the solenoid valve 18 is changed as illustrated in FIG. 5 (*c*).

For example, in a case where the throttle valve 92 is opened, a pressure in the intake pipe 60 is a pressure that is substantially identical to an atmospheric pressure. Because a pressure in the exhaust pipe 70 is a pressure that is substantially identical to an atmospheric pressure, the pressures in the intake pipe 60 and the exhaust pipe 70 are substantially identical to one another and a differential pressure between a front and a back of the solenoid valve 18 is substantially zero. On the other hand, in a case where the throttle valve 92 is closed, the intake pipe 60 is provided in a vacuum state and a pressure in the intake pipe 60 is less than an atmospheric pressure. Because a pressure in the exhaust pipe 70 is a pressure that is substantially identical to an atmospheric pressure, a difference occurs between the pressures in the intake pipe 60 and the exhaust pipe 70 and a pressure difference (differential pressure) is occurs between a front and a back of the solenoid valve 18.

In FIG. 5 (*b*), a degree of valve opening of the throttle valve 92 is decreased with decreasing a valve angle thereof, and the degree of valve opening is increased with increasing the valve angle. Therefore, a differential pressure between a front and a back of the solenoid valve 18 is increased from time T2 to time T3 in FIG. 5 (*c*).

As illustrated in FIG. 5 (*e*), a pressure in the intake pipe 60 between time T2 and time T3 is less than a pressure between time T1 and time T2. Thus, a differential pressure between a front and a back of the solenoid valve 18 is changed in accordance with a change in a degree of valve opening of the throttle valve 92, that is, a pressure (intake pressure) in the intake pipe 60. Attention is paid to such a point in the present embodiment, and the correction determination unit 131 determines the differential pressure correction signal IP based on an intake pressure that is detected by the intake pipe pressure sensor 15.

Next, the differential pressure correction signal IP that is determined by the correction determination unit 131 will be described by using FIG. 6 to FIG. 10. First, a relationship between quick opening that is caused in the solenoid valve 18 and the valve head 188 will be described by using FIG. 6 to FIG. 9. FIG. 6 to FIG. 9 are diagrams illustrating quick opening that is caused in the solenoid valve 18.

Figure 6:
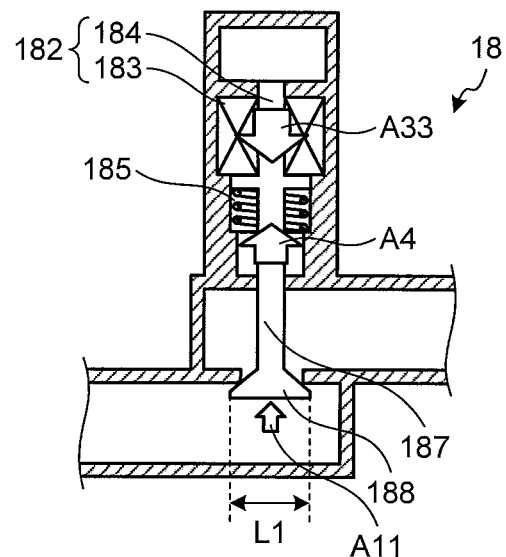
FIG. 6 is a diagram illustrating quick opening that occurs in a solenoid valve according to an embodiment.

As illustrated in FIG. 6, biasing force A4 that is provided by the elastic member 185 is applied to the solenoid valve 18 in a predetermined direction (upward direction in FIG. 6). A pressure that is the differential pressure A11 (that will also be described as pushing force A11 below) is applied to the solenoid valve 18 in a direction identical to that of the biasing force A4. Herein, a magnitude of the pushing force A11 that is caused by the differential pressure is changed in accordance with a surface area of the valve head 188. For example, in a case where the valve head 188 has a circular shape, the pushing force A11 that corresponds to a diameter L1 thereof is applied to the solenoid valve 18.

Thrust force A33 is applied to the solenoid valve 18 in a direction (downward direction in FIG. 6) opposite to the predetermined direction in accordance with electric current that flows in the linear solenoid 182. The thrust force A33 increases in proportion to a magnitude of electric current that flows in the linear solenoid 182.

Figure 7:
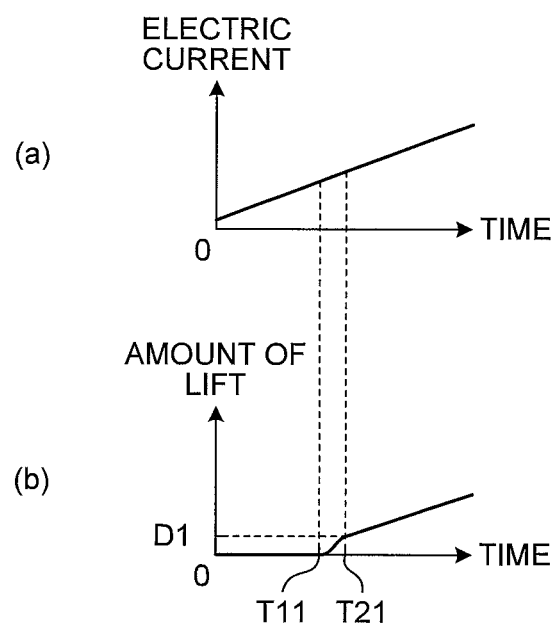
FIG. 7 is a diagram illustrating quick opening that occurs in a solenoid valve according to an embodiment.

Herein, a relationship between electric current that flows in the linear solenoid 182 and the amount of a lift D of the solenoid valve 18 will be described by using FIGS. 7 (*a*) and (*b*). FIG. 7 (*a*) is a graph illustrating electric current that flows in the linear solenoid 182, where a vertical axis indicates the electric current and a horizontal axis indicates time. FIG. 7 (*b*) is a graph illustrating the amount of a lift D of the solenoid valve 18 in a case where electric current is changed as illustrated in FIG. 7 (*a*), where a vertical axis indicates the amount of a lift and a horizontal axis indicates time.

As illustrated in FIG. 7 (*a*), as electric current that flows in the linear solenoid 182 is increased, the thrust force A33 that is applied to the solenoid valve 18 is increased. As long as the thrust force A33 is less than or equal to a sum of the biasing force A4 of the elastic member 185 and the pushing force A11 (A33≤A4+A11), that is, by time T11 in FIG. 7 (*b*), the solenoid valve 18 is not opened and the amount of a lift D is zero.

As the thrust force A33 is greater than a sum of the biasing force A4 of the elastic member 185 and the pushing force A11 at the time T11 (A33>A4+A11), the solenoid valve 18 is opened. As the solenoid valve 18 is opened, the differential pressure is decreased. Herein, the pushing force A11 that is caused by the differential pressure is negligibly small, in order to simplify the description thereof.

Thereby, a state is provided where the thrust force A33 and the biasing force A4 are applied to the solenoid valve 18. Herein, the thrust force A33 is greater than the biasing force A4 because the pushing force A11 is eliminated. Accordingly, force is applied to the solenoid valve 18 in a direction of opening thereof (downward direction in FIG. 6) by a difference Ad1 between the thrust force A33 and the biasing force A4 (Ad1=A33−A4) so that the valve moves by an amount of a lift D1 thereof and is opened quickly.

As the valve head 188 is moved, the biasing force A4 of the elastic member 185 is increased so that the difference Ad1 between the thrust force A33 and the biasing force A4 is decreased. As the difference Ad1 between the thrust force A33 and the biasing force A4 is zero at time T21, the amount of a lift D of the solenoid valve 18 is subsequently increased in proportion to electric current that flows in the linear solenoid 182.

Herein, it is desired that a smaller amount or larger amount of exhaust gas circularly flows from the exhaust side circulation flow pipe 72*a* to the intake side circulation flow pipe 72*b* in order to further reduce NOx in the exhaust gas. That is, it is desired that a range of a flow rate of exhaust gas that can be adjusted by the solenoid valve 18 that is an EGR valve is extended. As a method for increasing a flow rate for the solenoid valve 18, for example, a method for increasing a surface area of the valve head 188 is provided.

Hereinafter, quick opening of the solenoid valve 18 that is caused in a case where a surface area of the valve head 188 is increased to increase a flow rate for the solenoid valve 18 will be described by using FIG. 8 and FIG. 9.

Figure 8:
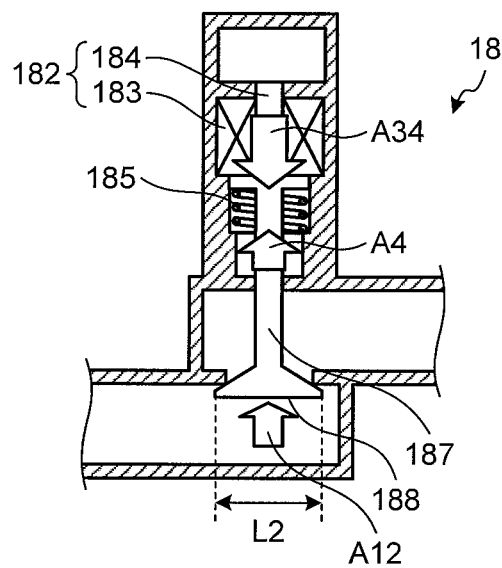
FIG. 8 is a diagram illustrating quick opening that occurs in a solenoid valve according to an embodiment.

As illustrated in FIG. 8, the biasing force A4 and pushing force A12 are applied to the solenoid valve 18 in a predetermined direction. Thrust force A34 is applied to the solenoid valve 18 in a direction opposite to the predetermined direction. As described above, in a case where the differential pressure is constant, a magnitude of the pushing force A12 is changed in accordance with a surface area of the valve head 188. Herein, the valve head 188 as illustrated in FIG. 8 has a diameter L2 (L2>L1) that is greater than that of the valve head 188 as illustrated in FIG. 7 (*a*). In such a case, the pushing force A12 that is greater than the pushing force A11 as illustrated in FIG. 6 (A11<A12) is applied to the solenoid valve 18.

A relationship between electric current that flows in the linear solenoid 182 and the amount of a lift D of the solenoid valve 18 will be described by using FIGS. 9 (*a*) and (*b*). FIG. 9 (*a*) is a graph illustrating electric current that flows in the linear solenoid 182, where a vertical axis indicates the electric current and a horizontal axis indicates time. FIG. 9 (*b*) is a graph illustrating the amount of a lift D of the solenoid valve 18 in a case where the electric current is changed as illustrated in FIG. 9 (*a*), where a vertical axis indicates the amount of a lift and a horizontal axis indicates time.

Figure 9:
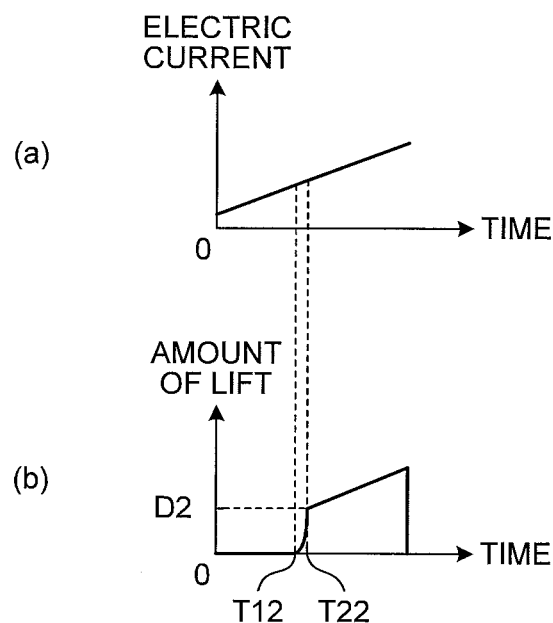
FIG. 9 is a diagram illustrating quick opening that occurs in a solenoid valve according to an embodiment.

As illustrated in FIG. 9 (*a*), the thrust force A34 that is applied to the solenoid valve 18 is increased with increasing electric current that flows in the linear solenoid 182. As long as the thrust force A34 is less than or equal to a sum of the biasing force A4 of the elastic member 185 and the pushing force A12 (A34≤A4+A12), that is, by time T12 in FIG. 9 (*b*), the solenoid valve 18 is not opened and the amount of a lift D is zero.

As the thrust force A34 is greater than a sum of the biasing force A4 of the elastic member 185 and the pushing force A12 at the time T12 (A34>A4+A12), the solenoid valve 18 is opened. Herein, as the solenoid valve 18 is opened, the differential pressure is also decreased so that the pushing force A12 is negligible.

Thereby, a state is provided where the thrust force A34 and the biasing force A4 are applied to the solenoid valve 18. Herein, the thrust force A34 is greater than the biasing force A4 because the pushing force A12 is eliminated. Accordingly, force is applied to the solenoid valve 18 in a direction of valve opening (downward direction in FIG. 8) by a difference Ad2 between the thrust force A34 and the biasing force A4 (Ad2=A34−A4) so that the solenoid valve 18 moves by an amount of a lift D2 thereof and is opened quickly.

As the valve head 188 is moved, the biasing force A4 of the elastic member 185 is increased so that the difference Ad2 between the thrust force A34 and the biasing force A4 is decreased. As the difference Ad2 between the thrust force A34 and the biasing force A4 is zero at time T22, the amount of a lift D of the solenoid valve 18 is subsequently increased in proportion to electric current that flows in the linear solenoid 182.

Herein, as described above, the pushing force A12 as illustrated in FIG. 8 is greater than the pushing force A11 as illustrated in FIG. 6. Accordingly, the difference Ad2 between the thrust force A34 and the biasing force A4 is greater than the difference Ad1. Accordingly, an amount of valve opening (amount of a lift) D2 of the solenoid valve 18 that is moved in accordance with the difference Ad2 between the thrust force A34 and the biasing force A4 is greater than an amount of quick opening (amount of a lift) D1 in a case of the difference Ad1 (D2>D1).

Thus, as a surface area of the valve head 188 is increased so as to increase a flow rate of circularly flowing exhaust gas, the solenoid valve 18 is greatly and quickly opened, so that it is difficult to cause a small flow rate of exhaust gas to flow circularly. That is, as an upper limit of a range of a flow rate of exhaust gas that can be adjusted by the solenoid valve 18 that is an EGR valve becomes greater, a lower limit thereof also becomes greater, so that it is difficult to extend the range. In the present embodiment, even in a case an upper limit of an operating range of the solenoid valve 18 becomes greater, the differential pressure correction signal IP is input to the linear solenoid 182 so that quick opening thereof is suppressed and a lower limit of the operating range becomes smaller. Thereby, an operating range of the solenoid valve 18 can further be extended.

Figure 10:
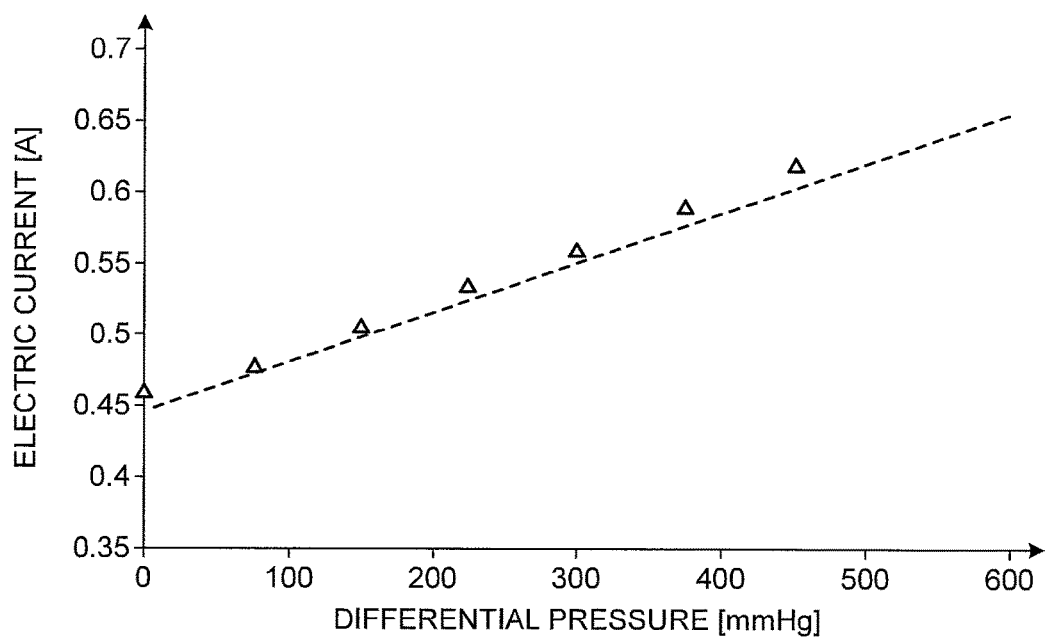
FIG. 10 is a graph illustrating a relationship between a differential pressure and electric current flowing in a solenoid valve according to an embodiment.

Next, the differential pressure correction signal IP that is determined by the correction determination unit 131 will be described by using FIG. 10. FIG. 10 is a graph illustrating a relationship between the differential pressure and electric current that flows in the solenoid valve 18, where a vertical axis indicates the electric current and a horizontal axis indicates the differential pressure.

A dotted line in FIG. 10 is a line that indicates quick opening electric current needed to open the solenoid valve 18. As illustrated in FIG. 10, the quick opening electric current is increased with increasing the differential pressure. In a case where electric current that flows in the linear solenoid 182 is less than or equal to the quick opening electric current, the amount of a lift D of the solenoid valve 18 is zero and the solenoid valve is not opened. As electric current that flows in the linear solenoid 182 is greater than the quick opening electric current, the solenoid valve 18 is opened. Herein, as electric current that flows in the linear solenoid 182 is increased over the quick opening electric current, the solenoid valve 18 is quickly opened more greatly.

A point indicated by a triangle in FIG. 10 is a point that indicates a value of electric current of the differential pressure correction signal IP that is determined by the correction determination unit 131. As illustrated in FIG. 10, the correction determination unit 131 determines the differential pressure correction signal IP so as to have a value of electric current that is slightly greater than the quick opening electric current (that will be described as a correction electric current value, below). The correction determination unit 131 determines the differential pressure correction signal IP so as to provide a state where the solenoid valve 18 is substantially closed, that is, so as to open the valve slightly.

The amount of a lift D of the solenoid valve 18 that is slightly opened in accordance with the differential pressure correction signal IP is, for example, such that exhaust gas does not flow from the exhaust side circulation flow pipe 72*a* to the intake side circulation flow pipe 72*b*. Alternatively, the amount of a lift D is, for example, a small amount of a lift D such that even if exhaust gas flows from the exhaust side circulation flow pipe 72*a* to the intake side circulation flow pipe 72*b*, a system with the solenoid valve 18 being applied thereto, such as an EGR mechanism, is not affected thereby. Herein, the amount of a lift D is, for example, less than or equal to 0.5 mm to 0.1 mm.

In an example illustrated in FIG. 10, the correction determination unit 131 determines the differential pressure correction signal IP, for example, in such a manner that the correction electric current value is about 0.48 A in a case where the differential pressure is about 80 mmHg. Herein, the differential pressure correction signal IP is a PWM signal and the correction determination unit 131 determines a duty ratio in such a manner that an average electric current value is a correction electric current value that corresponds to the differential pressure, and thereby, determines the differential pressure correction signal IP.

The amount of a lift D as described above or the quick opening electric current or correction electric current value as illustrated in FIG. 10 is an example, and is changed in accordance with a surface area of the valve head 188, a kind of a fluid that flows through the solenoid valve 18, a system with the solenoid valve 18 applied thereto, or the like. Such quick opening electric current or a correction electric current value that corresponds to the differential pressure is preliminarily obtained by an experiment or the like, and is stored in the storage unit 140, for example, while the intake pressure and the correction electric current value are associated with one another. The correction determination unit 131 determines the differential pressure correction signal IP that has a correction electric current value that corresponds to an intake pressure that is detected by the intake pipe pressure sensor 15 based on such an intake pressure. The correction determination unit 131 outputs the determined differential pressure correction signal IP to the addition unit 132.

Alternatively, for example, the intake pressure and the duty ratio instead of the correction electric current value may be associated with one another and stored in the storage unit 140. In such a case, the correction determination unit 131 refers to the storage unit 140 and determined the differential pressure correction signal IP that has the duty ratio that corresponds to the intake pressure.

The correction determination unit 131 may determine the differential pressure correction signal IP in a case where an EGR condition is satisfied, that is, a case where the internal combustion engine recirculates exhaust gas, independently of the target degree of valve opening DT that is determined by the determination unit 110. That is, the differential pressure correction signal IP is also determined in a case of a valve closing state where the solenoid valve 18 is not driven. In other words, the correction determination unit 131 does not determine the differential pressure correction signal IP in a case where EGR is not executed, for example, immediately after IG-ON, at a time of idling of the internal combustion engine, at a time of low water temperature, at a time of fuel cut, or the like. Accordingly, the differential pressure correction signal IP is not input to the solenoid valve 18 in a case where there is no possibility of opening of the solenoid valve 18. Thereby, electric power consumption of the solenoid valve 18 can be reduced.

3. 4. 3. 2. Addition Unit 132

The addition unit 132 as illustrated in FIG. 3 adds the driving signal I that is set by the setting unit 120 and the differential pressure correction signal IP that is determined by the correction determination unit 131 to generate the corrected driving signal IC. The addition unit 132 inputs the generated correction driving signal IC to the linear solenoid 182 of the solenoid valve 18, and thereby, drives the solenoid valve 18.

Figure 11:
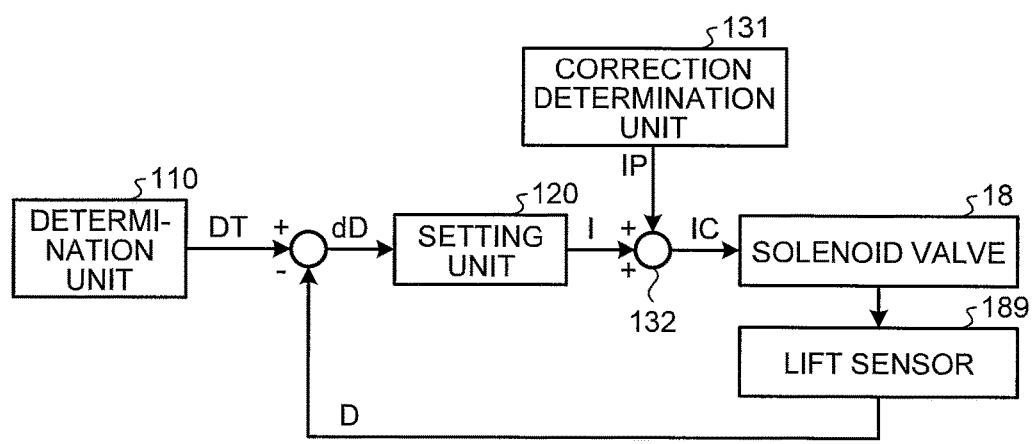
FIG. 11 is a block diagram illustrating a control system of a solenoid valve device according to an embodiment.

Herein, a control system of the solenoid valve device 10 will be described by using FIG. 11. FIG. 11 is a block diagram illustrating a control system of the solenoid valve device 10. As illustrated in FIG. 11, the determination unit 110 outputs the target degree of valve opening DT. The lift sensor 189 outputs the amount of a lift D of the solenoid valve 18. The setting unit 120 sets the driving signal I based on a difference dD between the target degree of valve opening DT and the amount of a lift D. The driving signal I is input to the solenoid valve 18 through the addition unit 132 to drive the solenoid valve 18. The lift sensor 189 detects, and outputs to the setting unit 120, the amount of a lift D that is an amount of driving of the solenoid valve 18. Thus, the solenoid valve device 10 has a feedback control system that includes the determination unit 110 and the setting unit 120.

As illustrated in FIG. 11, the differential pressure correction signal IP that is determined by the correction determination unit 131 is added to the driving signal I by the addition unit 132 so that the corrected driving signal IC is input to the solenoid valve 18. Thus, the solenoid valve device 10 executes the feedback control as described above and executes feedforward control for inputting the differential pressure correction signal IP that corresponds to the differential pressure to the solenoid valve 18 until the degree of valve opening D of the solenoid valve 18 is the target degree of valve opening DT.

Figure 12:
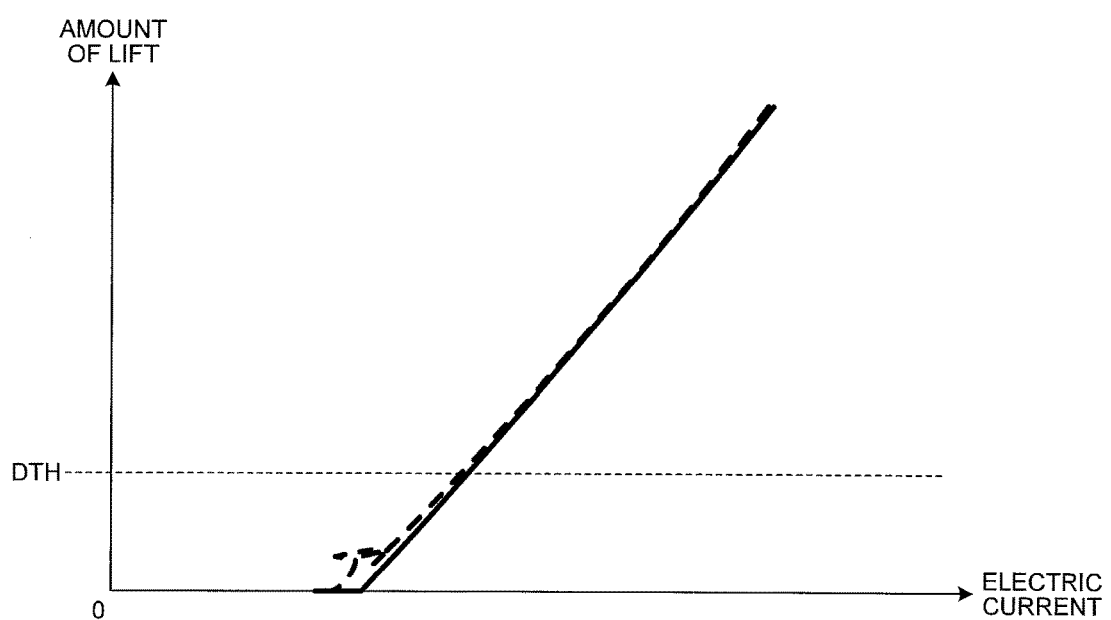
FIG. 12 is a graph illustrating a relationship between electric current flowing in a solenoid valve and an amount of a lift according to an embodiment.

Thus, the solenoid valve device 10 executes the feedforward control in accordance with the differential pressure in addition to the feedback control so that quick opening of the solenoid valve 18 can be suppressed as illustrated in FIG. 12. FIG. 12 is a graph illustrating a relationship between electric current that flows in the solenoid valve 18 and the amount of a lift D, where a vertical axis indicates the amount of a lift and a horizontal axis indicates the electric current.

A solid line in FIG. 12 is a graph illustrating the amount of a lift D in a case where the feedforward control is executed in accordance with the differential pressure in addition to the feedback control, that is, a case where the differential pressure correction signal IP in addition to the driving signal I is input to the solenoid valve 18. On the other hand, a dotted line in FIG. 12 is a graph illustrating the amount of a lift D in a case where only the feedback control is executed, that is, a case where only the driving signal I is input to the solenoid valve 18.

As illustrated in FIG. 12, it is found that quick opening is not caused in a case where the feedforward control is executed in accordance with the differential pressure in addition to the feedback control whereas quick opening is caused in a case where only the feedback control is executed. Thus, the solenoid valve 18 is controlled by using the driving signal I and the differential pressure correction signal IP so that accuracy of control of the solenoid valve 18 can be improved. Accordingly, the solenoid valve 18 can be operated extensively.

Even if the solenoid valve 18 is quickly opened, its influence on the amount of a lift D of the solenoid valve 18 is small in a case where the target degree of valve opening DT is large, and hence, the correction determination unit 131 may determine the differential pressure correction signal IP, for example, in a case where the target degree of valve opening DT is less than or equal to a threshold DTH (see FIG. 12).

As described above, the correction determination unit 131 determines the differential pressure correction signal IP, for example, even in a case where the target degree of valve opening DT is zero. Herein, the setting unit 120 does not output the driving signal I to the addition unit 132, and hence, the addition unit 132 outputs the differential pressure correction signal IP as the corrected driving signal IC to the linear solenoid 182. Alternatively, the setting unit 120 outputs the driving signal I with an electric current value that is zero, namely, a duty ratio that is zero percent, and the addition unit 132 adds the driving signal I and the differential pressure correction signal IP to generate the corrected driving signal IC.

Herein, any of the driving signal I that is set by the setting unit 120 and the differential pressure correction signal IP that is determined by the correction determination unit 131 is a PWM signal and is not limited thereto. For example, the driving signal I may be a signal that indicates an electric current value that corresponds to a difference dD between the amount of a lift D and the target degree of vale opening DT of the solenoid valve 18, and the differential pressure correction signal IP may be a signal that indicates a correction electric current value. In such a case, the addition unit 132 determines a duty ratio of the corrected driving signal IC in such a manner that an average electric current value of the corrected driving signal IC is a value provided by adding an electric current value that is indicated by the driving signal I and a correction electric current value that is indicated by the differential pressure correction signal IP. The addition unit 132 generates, and outputs to the linear solenoid 182, the corrected driving signal IC that is a PWM signal that has the determined duty ratio.

3. 4. 4. Storage Unit 140

The storage unit 140 stores information needed for a process that is executed by each unit of the solenoid valve device 10, for example, a correction electric current value that is determined by the correction determination unit 131 or the like. The storage unit 140 stores a result of a process executed by each unit of the solenoid valve device 10.

The storage unit 140 is a storage device, for example, a semiconductor memory element such as a Random Access Memory (RAM) or a flash memory, a hard disk, an optical disk, or the like.

4. Solenoid Valve Control Process

Figure 13:
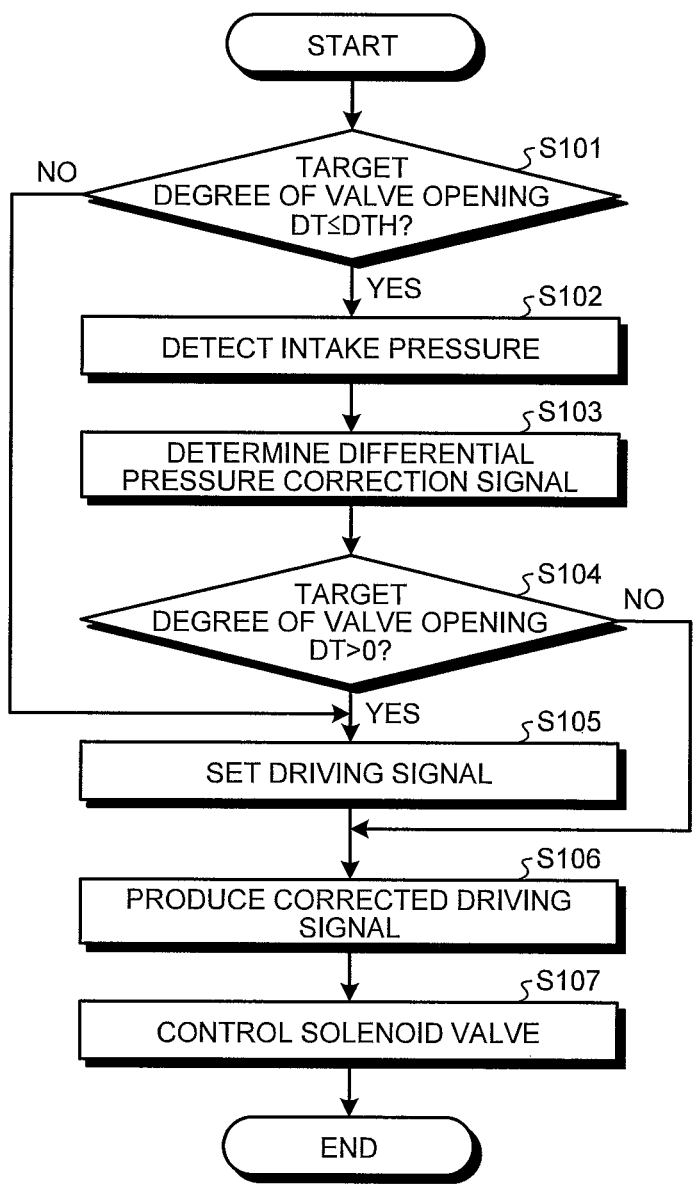
FIG. 13 is a flowchart illustrating steps of a process that is executed by a solenoid valve device according to an embodiment.

Next, steps of a process that is executed by the solenoid valve device 10 according to the present embodiment will be described by using FIG. 13. FIG. 13 is a flowchart illustrating steps of a process that is executed by the solenoid valve device 10 according to the present embodiment. The solenoid valve device 10 according to the present embodiment executes a solenoid valve control process, for example, in a case except immediately after IG-ON, at a time of idling of the internal combustion engine, at a time of low water temperature, at a time of fuel cut, or the like, that is, a case where EGR is executed. The solenoid valve device 10 executes a solenoid valve control process as illustrated in FIG. 13, as notice for controlling the solenoid valve 18 is received from, for example, a non-illustrated EGR control unit.

As illustrated in FIG. 13, the solenoid valve device 10 determines whether or not the target degree of valve opening DT of the solenoid valve 18 is less than or equal to a threshold DTH (step S101). Such determination is executed by, for example, the correction determination unit 131 of the solenoid valve device 10. In a case where the target degree of valve opening DT is greater than the threshold DTH (DT>DTH, "No" at step S101), it goes to step S105.

On the other hand, in a case where the target degree of valve opening DT is less than or equal to the threshold DTH (DT≤DTH, "Yes" at step S101), the intake pipe pressure sensor 15 for the solenoid valve device 10 detects an intake pressure (step S102). The solenoid valve device 10 determines the differential pressure correction signal IP based on the intake pressure detected at step S102 (step S103). The solenoid valve device 10 determines whether or not the target degree of valve opening DT is greater than zero (step S104). Such determination is executed by, for example, the setting unit 120 of the solenoid valve device 10.

As a result of the determination, in a case where the target degree of valve opening DT is less than or equal to zero ("No" at step S104), it goes to step S106. On the other hand, in a case where the target degree of valve opening DT is greater than zero ("Yes" at step S104), the solenoid valve device 10 sets the driving signal I in accordance with the target degree of valve opening DT and the amount of a lift D of the solenoid valve 18 (step S105).

Then, the solenoid valve device 10 generates the corrected driving signal IC (step S106). For example, in a case where determination is provided at step S101 in such a manner that the target degree of valve opening DT is greater than the threshold DTH so that the differential pressure correction signal IP is not determined, the solenoid valve device 10 causes the driving signal I set at step S105 to be the corrected driving signal IC. In a case where the differential pressure correction signal IP and the driving signal I are set at steps S103 and S106, respectively, the solenoid valve device 10 causes a signal provided by adding the differential pressure correction signal IP and the driving signal I to be the corrected driving signal IC. In a case where determination is provided at step S104 in such a manner that the target degree of valve opening DT is less than or equal to zero so that the driving signal I is not set, the solenoid valve device 10 causes the differential pressure correction signal IP determined at step S103 to be the corrected driving signal IC.

The solenoid valve device 10 controls the solenoid valve 18 based on the corrected driving signal IC generated at step S106 (step S107) and ends the process.

The solenoid valve device 10 repeatedly executes the process in FIG. 13, for example, at a predetermined interval, while EGR is executed and until the degree of valve opening D of the solenoid valve 18 is the target degree of valve opening DT. For example, in a case where notice is provided in such a manner that a flow rate of exhaust gas from the EGR control unit is changed, that is, the degree of valve opening D of the solenoid valve 18 is changed, the process in FIG. 13 is executed for a predetermined period of time until the degree of valve opening D of the solenoid valve 18 is the target degree of valve opening DT after such a change. For example, the process as illustrated in FIG. 13 may be executed in a case where the differential pressure is changed by a predetermined value or greater. In a case where the target degree of valve opening DT is zero, the process at step S104 may be omitted. In a case where the degree of valve opening of the solenoid valve 18 is the target degree of valve opening DT, the solenoid valve device 10 executes the feedback control based on the lift sensor 189.

As described above, the solenoid valve device 10 according to the present embodiment sets the differential pressure correction signal IP based on a differential pressure between a front and a back of the solenoid valve 18 and controls the solenoid valve 18. Thereby, quick opening of the solenoid valve 18 can be suppressed so that a driving range of the solenoid valve 18 can be extended.

The differential pressure correction signal IP is set in accordance with a result of detection of the intake pipe pressure sensor 15 based on knowledge that a differential pressure between a front and a back of the solenoid valve 18 and the intake pressure have a proportional relationship with one another. Because the intake pipe pressure sensor 15 is provided to detect the intake pressure of the internal combustion engine, a sensor for detecting a differential pressure between a front and a back of the solenoid valve 18 need not be provided separately and a driving range of the solenoid valve 18 can be extended without increasing the number of components thereof.

5. Variations

A variation of the solenoid valve device 10 according to the present embodiment will be described by using FIG. 14 to FIG. 16.

5. 1. Variation 1

Figure 14:
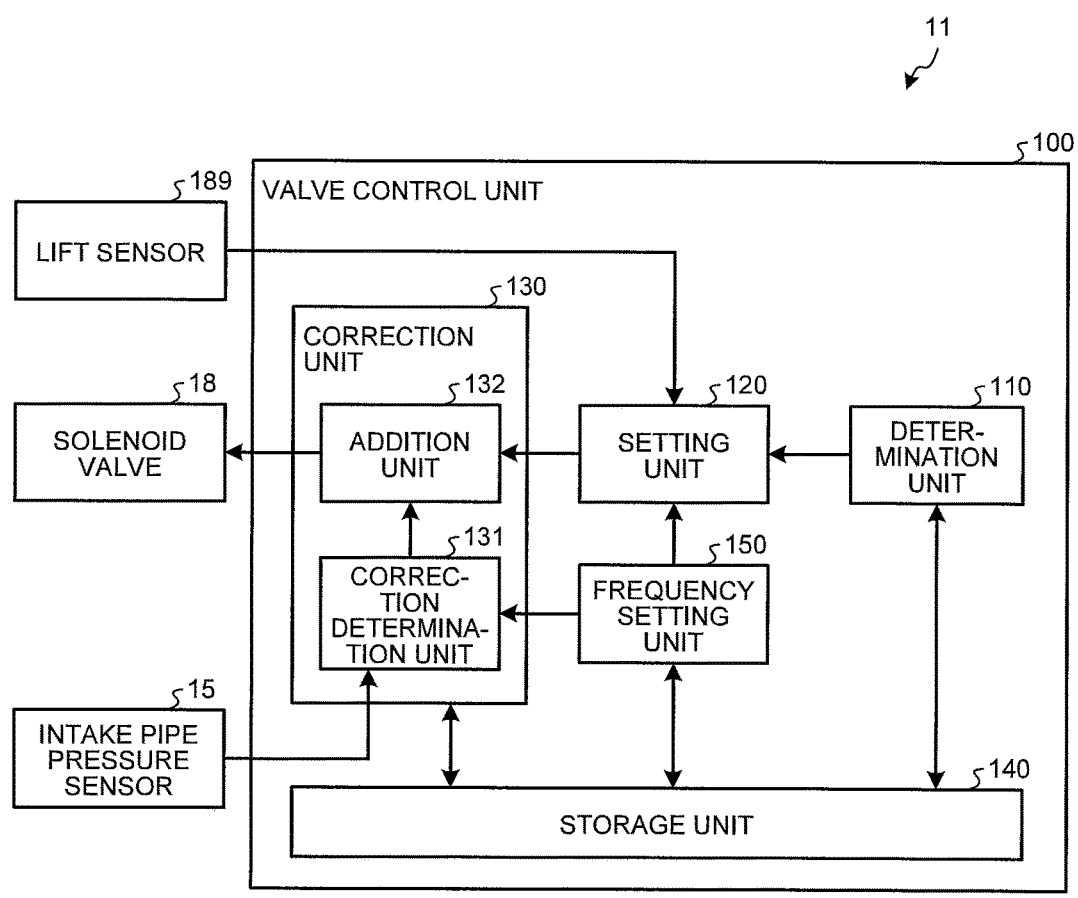
FIG. 14 is a diagram illustrating a configuration of a solenoid valve device according to variation 1 of an embodiment.
Figure 15:
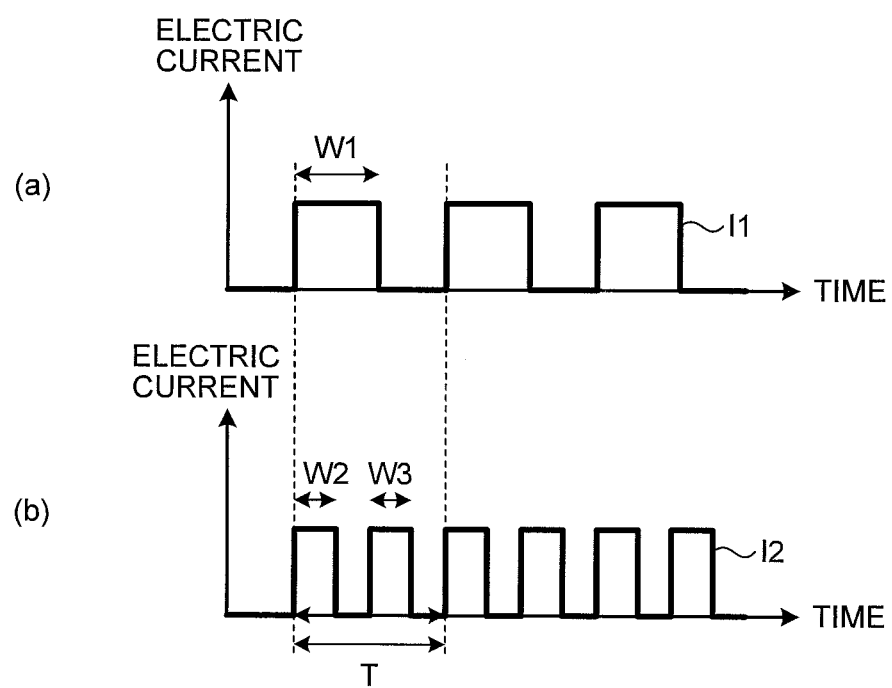
FIG. 15 is a diagram illustrating an example of a PWM signal according to variation 1 of an embodiment.

FIG. 14 is a diagram illustrating a configuration of a solenoid valve device 11 according to variation 1. A configuration of the solenoid valve device 11 according to variation 1 is identical to that of the solenoid valve device 10 as illustrated in FIG. 3 except that the valve control unit 100 includes a frequency setting unit 150. A component identical to that of the solenoid valve device 10 as illustrated in FIG. 3 is provided with an identical symbol and a description thereof will be omitted.

The frequency setting unit 150 sets frequencies of the driving signal I that is set by the setting unit 120 and the differential pressure correction signal IP that is determined by the correction determination unit 131. Herein, a relationship between a frequency and an electric current value of a PWM signal will be described by using FIG. 15. FIG. 15 is a diagram illustrating an example of a PWM signal. A PWM signal I1 as illustrated in FIG. 15 (a) is a signal with a predetermined duty ratio X and a frequency F. A PWM signal I2 as illustrated in FIG. 15 (b) is a signal with the predetermined duty ratio X and a frequency 2F. That is, the PWM signal I2 is a signal that has the same duty ratio X as, and twice the frequency of, the PWM signal I1. In FIGS. 15 (a) and (b), vertical axes indicate electric current and horizontal axes indicate time.

A pulse width W1 of the PWM signal I1 for a predetermined period of time T is a pulse width W (W=W2+W3) of the PWM signal I2 (W1<W). Therefore, an average electric current value of the PWM signal I2 is greater than an average electric current value of the PWM signal I1. Thus, in a case of a constant duty ratio, an average electric current value of a PWM signal is increased with increasing a frequency thereof.

Accordingly, the correction determination unit 131 may be unable to determine the differential pressure correction signal IP that has a correction electric current value so as to contract influence of the differential pressure, in accordance with a frequency. Such a point will be described by using FIG. 16. FIG. 16 is a graph illustrating a relationship between the differential pressure and electric current that flows in the solenoid valve 18, where a vertical axis indicates the electric current and a horizontal axis indicates the differential pressure. The graph is identical to that illustrated in FIG. 10 except that a correction electric current value is indicated for each frequency.

Figure 16:
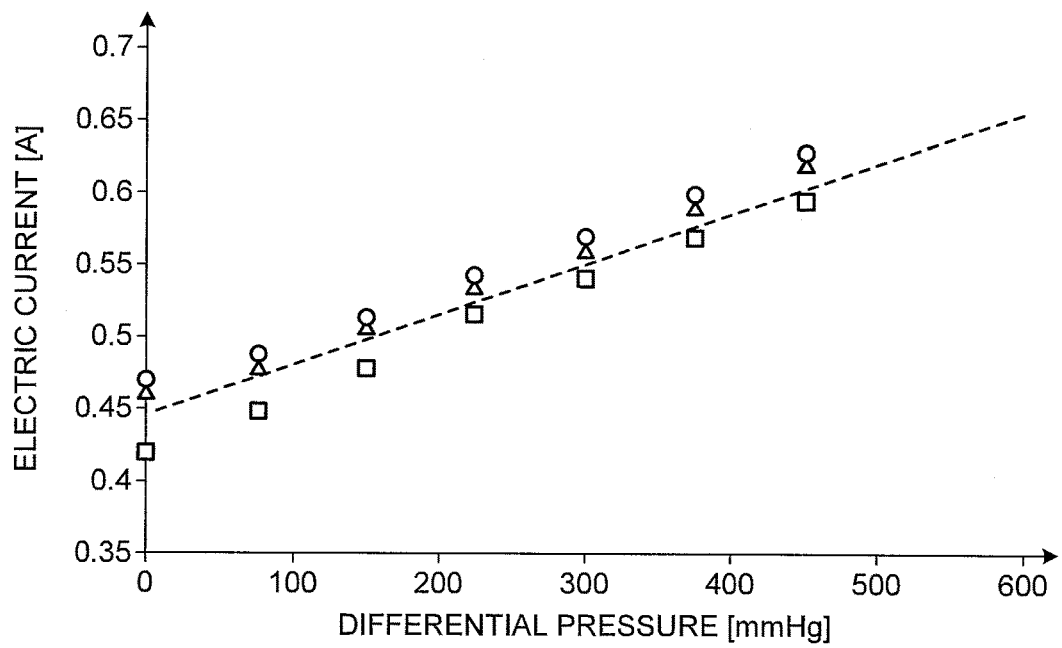
FIG. 16 is a graph illustrating a relationship between a differential pressure and electric current flowing in a solenoid valve according to variation 1 of an embodiment.

Each of circular, triangular, and square points as illustrated in FIG. 16 is a point that indicates an electric current value of the differential pressure correction signal IP that is determined by, for example, the correction determination unit 131, and each of them has a different frequency and a constant duty ratio. In FIG. 16, the differential pressure correction signal IP as indicated by a circular point has a highest frequency while the differential pressure correction signal IP as indicated by a square point has a lowest frequency.

As illustrated in FIG. 16, each electric current value of the differential pressure correction signal IP has a different value as a frequency is different even when a duty ratio is constant. Herein, any electric current value of the differential pressure correction signal IP that has a lowest frequency (see a square point in FIG. 16) is less than that of the quick opening electric current. Accordingly, even if the correction determination unit 131 determines the differential pressure correction signal IP, thrust force that is greater than the differential pressure cannot be applied to the solenoid valve 18 so that the solenoid valve 18 is opened quickly.

Hence, the frequency setting unit 150 sets frequencies of the differential pressure correction signal IP and the driving signal I, in accordance with, for example, a duty ratio of the differential pressure correction signal IP. For example, as described above, in a case where the correction determination unit 131 determines a duty ratio in accordance with the differential pressure to determine the differential pressure correction signal IP, the frequency setting unit 150 sets the frequencies in accordance with such a duty ratio.

Alternatively, in a case where a duty ratio that can be determined by the correction determination unit 131 is provided with an upper limit, the frequency setting unit 150 sets the frequencies in such a manner that a desired electric current value is obtained even in a case where a duty ratio that is determined by the correction determination unit 131 is the upper limit.

Herein, in a case where a duty ratio of the differential pressure correction signal IP is not provided with an upper limit, the correction determination unit 131 can determine, for example, the differential pressure correction signal IP with a duty ratio that is 100 percent. In such a case, even if the setting unit 120 sets the driving signal I that corresponds to the target degree of valve opening DT, a duty ration of the corrected driving signal IC cannot be greater than or equal to 100 percent so that the solenoid valve 18 cannot be driven based on the driving signal I.

Accordingly, for example, a duty ratio that can be determined by the correction determination unit 131 is provided with an upper limit, and thereby, the solenoid valve device 11 can drive the solenoid valve 18 based on the driving signal I. In such a case, the frequency setting unit 150 sets the frequencies in accordance with the upper limit of the duty ratio, so that the solenoid valve device 11 can suppress quick opening of the solenoid valve 18 and control the degree of valve opening D of the solenoid valve 18.

As described above, the frequency setting unit 150 of the solenoid valve device 11 according to variation 1 sets frequencies of the driving signal I that is set by the setting unit 120 and the differential pressure correction signal IP that is determined by the correction determination unit 131. Thereby, the solenoid valve device 11 can suppress quick opening of the solenoid valve 18 and control the degree of valve opening D of the solenoid valve 18.

Although the frequency setting unit 150 of the solenoid valve device 11 sets frequencies of the driving signal I and the differential pressure correction signal IP herein, frequencies that enable to control the degree of valve opening D of the solenoid valve 18 while quick opening of the solenoid valve 18 is suppressed may also be set preliminarily by, for example, an experiment or the like, in the solenoid valve device 10 as illustrated in FIG. 3.

5. 2. Other Variations

The embodiment and variation as described above have been described for a case where the solenoid valve 18 is an EGR valve and are not limited thereto. For an actuator that is used as the solenoid valve 18, for example, a solenoid valve that is used for hydraulic control or the like of an internal combustion engine, or the like, is provided. For example, it is useful for a solenoid valve that is readily affected by a differential pressure, such as, for example, a poppet-type valve or a throttle valve.

In the embodiment and variation as described above, the correction unit 130 corrects the driving signal I based on the intake pressure that is detected by the intake pipe pressure sensor 15 and this is not limiting. For example, as illustrated in FIG. 5, the differential pressure is changed in accordance with a valve angle of the throttle valve 92. Therefore, the correction determination unit 131 may set the differential pressure correction signal IP based on a valve angle of the throttle valve 92. Alternatively, a sensor that detects the differential pressure may be provided on the exhaust gas circulation flow pipe 72.

In a configuration of the embodiment and variation as described above, the amount of a lift of the solenoid valve 18 is detected as the degree of valve opening D by using the lift sensor 189 and this is not limiting. For example, the degree of valve opening D may be obtained based on electric current that flows in the linear solenoid 182. Because quick opening of the solenoid valve 18 is suppressed by the pressure correction signal IP in the present embodiment and variation, a relationship between electric current that flows in the linear solenoid 182 and the amount of a lift (degree of valve opening) D has a linearity as illustrated in FIG. 12. Therefore, the degree of valve opening D can be obtained at high accuracy based on electric current that flows in the linear solenoid 182. Because the lift sensor 189 can be omitted, the number of components of the solenoid valve device 10 or 11 can be reduced.

6. Hardware Configuration

Figure 17:
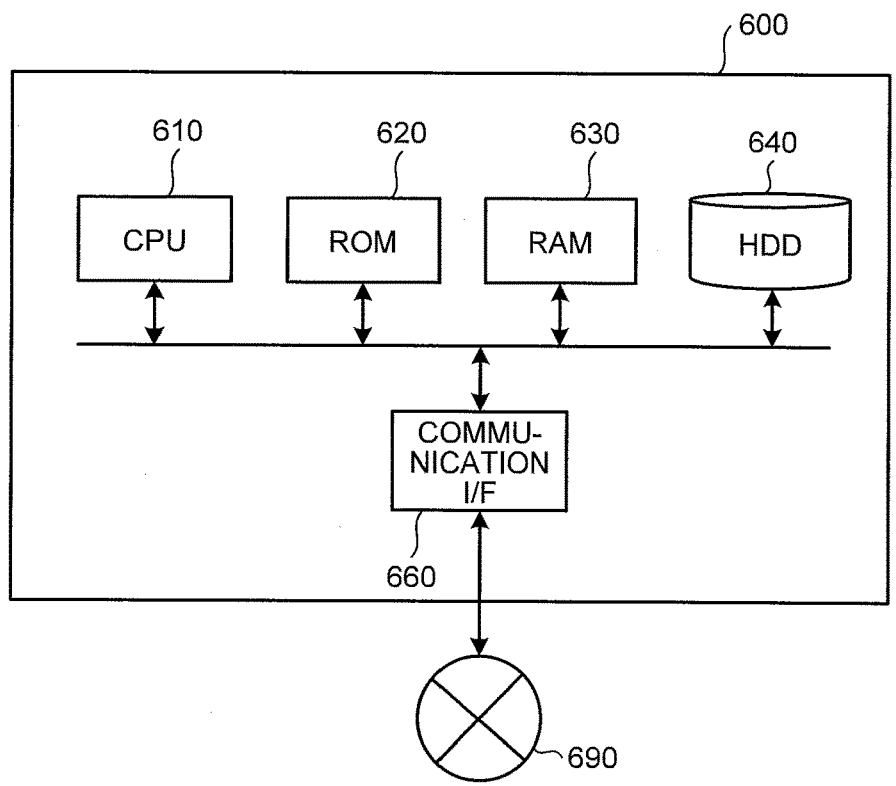
FIG. 17 is a hardware configuration diagram illustrating an example of a computer that realizes a function of a valve control unit of a solenoid valve device according to an embodiment.

The valve control unit 100 of the solenoid valve device 10 or 11 according to the present embodiment or variation can be realized by a computer 600 with a configuration as illustrated in FIG. 17 as an example. FIG. 17 is a hardware configuration diagram illustrating an example of a computer that realizes a function of the valve control unit 100 of the solenoid valve device 10 or 11.

The computer 600 includes a Central Processing Unit (CPU) 610, a Read Only Memory (ROM) 620, a Random Access Memory (RAM) 630, and a Hard Disk Drive (HDD) 640. The computer 600 includes a communication interface (I/F) 660.

The computer 600 includes a Solid State Drive (SSD) and such an SSD may execute a part or all of functions of the HDD 640. An SSD may be provided instead of the HDD 640.

The CPU 610 operates based on a program that is stored in at least one of the ROM 620 and the HDD 640 and executes control of each unit. The ROM 620 stores a boot program that is executed by the CPU 610 at a time of startup of the computer 600, a program that depends on hardware of the computer 600, or the like. The HDD 640 stores a program that is executed by the CPU 610, data that are used by such a program, and the like.

The communication I/F 660 receives, and sends to the CPU 610, data from another instrument through a network 690, and transmits data generated by the CPU 610 to another instrument through the network 690. Alternatively, the communication I/F 660 receives, and sends to the CPU 610, a program from another instrument through the network 690, and the CPU 610 executes such a program.

For example, in a case where the computer 600 functions as the valve control unit 100 of the solenoid valve device 10 or 11, the CPU 610 of the computer 600 executes a program stored on the ROM 620, and thereby, realizes each function of the determination unit 110, the setting unit 120, the frequency setting unit 150, and the correction determination unit 131 and the addition unit 132 of the correction unit 130 of the valve control unit 100 of the solenoid valve device 10 or 11. The HDD 640 can store information that is stored in the storage unit 140.

As described above, the solenoid valve device 10 or 11 according to the present embodiment or variation includes the solenoid valve 18, the determination unit 110, the setting unit 120, and the correction setting unit (correction unit) 130. The solenoid valve 18 is provided on the fluid channel (exhaust gas circulation flow pipe) 72 with a fluid (exhaust gas) passing there through and adjusts a flow rate of exhaust gas. The determination unit 110 determines the target degree of valve opening DT of the solenoid valve 18. The setting unit 120 sets the driving signal I for driving the solenoid valve 18 in such a manner that the degree of valve opening D of the solenoid valve 18 is the target degree of valve opening DT. The correction unit 130 sets the differential pressure correction signal IP for driving the solenoid valve 18 in accordance with a differential pressure in the exhaust gas circulation flow pipe 72 between a front and a back of the solenoid valve 18.

Thereby, the solenoid valve device 10 or 11 can counteract an influence of a differential pressure due to the differential pressure correction signal IP, can suppress quick opening of the solenoid valve 18, and can extend an operating range of the solenoid valve 18.

The correction unit 130 of the solenoid valve device 10 or 11 according to the present embodiment or variation sets the differential pressure correction signal IP in such a manner that electric current that is slightly greater than quick opening electric current needed to open the solenoid valve 18 flows in the solenoid valve 18.

Thereby, the solenoid valve device 10 or 11 can suppress quick opening of the solenoid valve 18 in a state where the solenoid valve 18 is not excessively opened and is substantially closed, due to the differential pressure correction signal IP, and can extend an operating range of the solenoid valve 18.

The solenoid valve 18 of the solenoid valve device 10 or 11 according to the present embodiment or variation includes the valve head 188 that opens or closes the exhaust gas circulation flow pipe 72, the elastic member 185 that applies biasing force to the valve head 188 in a predetermined direction, and the solenoid (the linear solenoid) 182 that applies thrust force to the valve head 188 in a direction opposite to the predetermined direction. The correction unit 130 sets the differential pressure correction signal IP in such a manner that the thrust force is slightly greater than a sum of the biasing force and a pressure that corresponds to the differential pressure.

Thereby, the solenoid valve device 10 or 11 can suppress quick opening of the solenoid valve 18 in a state where the solenoid valve 18 is not excessively opened and is substantially closed, due to the differential pressure correction signal IP, and can extend an operating range of the solenoid valve 18.

The correction unit 130 of the solenoid valve device 10 or 11 according to the present embodiment or variation includes the addition unit 132 that adds the driving signal I and the differential pressure correction signal IP to generate the corrected driving signal IC, and the solenoid valve 18 is driven based on the corrected driving signal IC.

Thereby, the solenoid valve device 10 or 11 can suppress quick opening of the solenoid valve 18 and drive the solenoid valve 18 in such a manner that the degree of valve opening D thereof is the target degree of valve opening DT, and can extend an operating range of the solenoid valve 18.

The correction unit 130 of the solenoid valve device 10 or 11 according to the present embodiment or variation sets the differential pressure correction signal IP in a case where the target degree of valve opening DT is less than or equal to a predetermined degree of valve opening DTH.

Thereby, the solenoid valve device 10 or 11 can drive the solenoid valve 18 in such a manner that the degree of valve opening D thereof is the target degree of valve opening DT without causing quick opening of the solenoid valve 18, and can extend an operating range of the solenoid valve 18, even in a case where the target degree of valve opening DT is small and the quick opening is readily caused.

The solenoid valve device 11 according to the present variation further includes the frequency setting unit 150 that sets frequencies of the driving signal I and the differential pressure correction signal IP at frequencies capable of driving the solenoid valve 18 for electric current greater than quick opening electric current.

Thereby, the solenoid valve device 11 can set the differential pressure correction signal IP that enables to suppress the quick opening independently of a duty ratio of the differential pressure correction signal IP, and can extend an operating range of the solenoid valve 18.

The solenoid valve device 10 or 11 according to the present embodiment or variation includes the intake pipe pressure sensor 15 that detects an intake pressure in the intake pipe 60 of an internal combustion engine. The solenoid valve 18 is arranged in the internal combustion engine. The correction unit 130 sets the differential pressure correction signal IP in accordance with the intake pressure.

Thereby, the solenoid valve device 10 or 11 need not separately provide a sensor for detecting a differential pressure between a front and a back of the solenoid valve 18 and can extend a driving range of the solenoid valve 18 without increasing the number of components thereof.

The solenoid valve 18 of the solenoid valve device 10 or 11 according to the present embodiment or variation is provided on a passage (exhaust gas circulation flow pipe 72) for recirculating exhaust gas in an internal combustion engine that has an exhaust gas recirculation mechanism. The correction unit 130 sets the differential pressure correction signal IP in a case where the internal combustion engine recirculates exhaust gas.

Thereby, the solenoid valve device 10 or 11 can extend a range of a flow rate of exhaust gas that can be adjusted by the solenoid valve 18 that is an EGR valve, and can further reduce a NOx in the exhaust gas.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A solenoid valve device, comprising:
   a solenoid valve that is provided on a fluid channel with a fluid passing therethrough and adjusts a flow rate of the fluid;
   a determination unit that determines a target degree of valve opening of the solenoid valve:
   a setting unit that sets a driving signal for driving the solenoid valve in such a manner that a degree of valve opening of the solenoid valve is the target degree of valve opening; and
   a correction setting unit that sets a differential pressure correction signal for driving the solenoid valve in accordance with a differential pressure on the fluid channel between a front and a back of the solenoid valve,
   wherein the correction setting unit sets the differential pressure correction signal in such a manner that electric current slightly greater than quick opening electric current needed to open the solenoid valve flows in the solenoid valve.

2. The solenoid valve device according to claim 1, wherein
   the correction setting unit includes an addition unit that adds the driving signal and the differential pressure correction signal to generate a corrected driving signal, and
   the solenoid valve is driven based on the corrected driving signal.

3. The solenoid valve device according to claim 1, wherein the correction setting unit sets the differential pressure correction signal in a case where the target degree of valve opening is less than or equal to a predetermined degree of valve opening.

4. The solenoid valve device according to claim 1, further comprising
   an intake pipe pressure sensor that detects an intake pressure in an intake pipe of an internal combustion engine,
   wherein the solenoid valve is arranged in the internal combustion engine and the correction setting unit sets the differential pressure correction signal in accordance with the intake pressure.

5. The solenoid valve device according to claim 1, wherein
   the solenoid valve is provided on a passage for recirculating exhaust gas in an internal combustion engine that has an exhaust gas recirculation mechanism, and
   the correction setting unit sets the differential pressure correction signal in a case where the internal combustion engine recirculates exhaust gas.

6. A solenoid valve device, comprising:
   a solenoid valve that is provided on a fluid channel with a fluid passing therethrough and adjusts a flow rate of the fluid;
   a determination unit that determines a target degree of valve opening of the solenoid valve;
   a setting unit that sets a driving signal for driving the solenoid valve in such a manner that a degree of valve opening of the solenoid valve is the target degree of valve opening; and
   a correction setting unit that sets a differential pressure correction signal for driving the solenoid valve in accordance with a differential pressure on the fluid channel between a front and a back of the solenoid valve,
   wherein the solenoid valve includes:
   a valve head that opens or closes the fluid channel;
   an elastic member that applies biasing force to the valve head in a predetermined direction; and
   a solenoid that applies thrust force to the valve head in a direction opposite to the predetermined direction, and
   the correction setting unit sets the differential pressure correction signal in such a manner that the thrust force is slightly greater than a sum of the biasing force and pushing force that is caused by the differential pressure.

7. The solenoid valve device according to claim 6, wherein
   the correction setting unit includes an addition unit that adds the driving signal and the differential pressure correction signal to generate a corrected driving signal, and
   the solenoid valve is driven based on the corrected driving signal.

8. The solenoid valve device according to claim 6, wherein the correction setting unit sets the differential pressure correction signal in a case where the target degree of valve opening is less than or equal to a predetermined degree of valve opening.

9. The solenoid valve device according to claim 6, further comprising
   an intake pipe pressure sensor that detects an intake pressure in an intake pipe of an internal combustion engine,
   wherein the solenoid valve is arranged in the internal combustion engine and the correction setting unit sets the differential pressure correction signal in accordance with the intake pressure.

10. The solenoid valve device according to claim 6, wherein
the solenoid valve is provided on a passage for recirculating exhaust gas in an internal combustion engine that has an exhaust gas recirculation mechanism, and
the correction setting unit sets the differential pressure correction signal in a case where the internal combustion engine recirculates exhaust gas.

11. A solenoid valve device, comprising:
a solenoid valve that is provided on a fluid channel with a fluid passing therethrough and adjusts a flow rate of the fluid;
a determination unit that determines a target degree of valve opening of the solenoid valve;
a setting unit that sets a driving signal for driving the solenoid valve in such a manner that a degree of valve opening of the solenoid valve is the target degree of valve opening;
a correction setting unit that sets a differential pressure correction signal for driving the solenoid valve in accordance with a differential pressure on the fluid channel between a front and a back of the solenoid valve; and
a frequency setting unit that sets frequencies of the driving signal and the differential pressure correction signal at frequencies capable of driving the solenoid valve for electric current greater than quick opening electric current.

12. The solenoid valve device according to claim 11, wherein
the correction setting unit includes an addition unit that adds the driving signal and the differential pressure correction signal to generate a corrected driving signal, and
the solenoid valve is driven based on the corrected driving signal.

13. The solenoid valve device according to claim 11, wherein the
correction setting unit sets the differential pressure correction signal in a case where the target degree of valve opening is less than or equal to a predetermined degree of valve opening.

14. The solenoid valve device according to claim 11, further comprising
an intake pipe pressure sensor that detects an intake pressure in an intake pipe of an internal combustion engine,
wherein the solenoid valve is arranged in the internal combustion engine and the correction setting unit sets the differential pressure correction signal in accordance with the intake pressure.

15. The solenoid valve device according to claim 11, wherein
the solenoid valve is provided on a passage for recirculating exhaust gas in an internal combustion engine that has an exhaust gas recirculation mechanism, and
the correction setting unit sets the differential pressure correction signal in a case where the internal combustion engine recirculates exhaust gas.

* * * * *